United States Patent
Origuchi

(10) Patent No.: US 8,289,682 B2
(45) Date of Patent: Oct. 16, 2012

(54) ELECTRONIC APPARATUS

(75) Inventor: Yohta Origuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 353 days.

(21) Appl. No.: 12/561,330

(22) Filed: Sep. 17, 2009

(65) Prior Publication Data

US 2010/0067180 A1   Mar. 18, 2010

(30) Foreign Application Priority Data

Sep. 18, 2008   (JP) ................. P2008-238997

(51) Int. Cl.
*H05K 5/00* (2006.01)
*H05K 7/00* (2006.01)
*H04N 7/18* (2006.01)
*G03B 17/00* (2006.01)

(52) U.S. Cl. ............ 361/679.01; 348/143; 396/419

(58) Field of Classification Search ............ 361/679.01, 361/679.02, 679.23; 348/143, 347, E05.045, 348/E07.085; 396/419, 427

See application file for complete search history.

(56) References Cited

U.S. PATENT DOCUMENTS

| 5,808,672 A | * | 9/1998 | Wakabayashi et al. .... 348/220.1 |
| 6,175,694 B1 | * | 1/2001 | Ichino et al. ............ 396/132 |
| 6,317,564 B1 | * | 11/2001 | Ichino et al. ............ 396/85 |
| 6,670,985 B2 | * | 12/2003 | Karube et al. ........... 348/207.1 |
| 7,362,513 B2 | * | 4/2008 | Kim et al. .............. 359/704 |
| 7,567,283 B2 | * | 7/2009 | Lee et al. .............. 348/335 |

FOREIGN PATENT DOCUMENTS

| JP | 2 15991 | 1/1990 |
| JP | 7 190162 | 7/1995 |
| JP | 2000 183620 | 6/2000 |
| JP | 2000 224463 | 8/2000 |
| JP | 2003-333372 | 11/2003 |
| JP | 2007-110472 | 4/2007 |

* cited by examiner

*Primary Examiner* — Adrian S Wilson
(74) *Attorney, Agent, or Firm* — Frommer Lawrence & Haug LLP; William S. Frommer; Thomas F. Presson

(57) ABSTRACT

Disclosed herein is an electronic apparatus, including: a first member; a second member provided on the first member for rotation in a first direction which is a circumferential direction around a first imaginary axis which passes the first member and a second direction reverse to the first direction; and a stopper mechanism for defining a range of rotation of the second member around the first imaginary axis.

3 Claims, 24 Drawing Sheets

ELECTRONIC APPARATUS

BACKGROUND OF THE INVENTION

1. Field of the Invention

This invention relates to an electronic apparatus.

2. Description of the Related Art

An electronic apparatus including a camera apparatus called pan-tilt camera which is attached in use to the ceiling or a wall of a building or a room is known and disclosed, for example, in Japanese Patent Laid-Open No. 2007-110472.

An electronic apparatus of the type described in most cases includes a base (first member), a frame (second member) provided on the base for rotation around an imaginary axis which passes the base, a camera section supported on the frame, and a driving section for rotating the frame around the imaginary axis, that is, for rotating the frame in a panning direction).

The electronic apparatus includes an electric circuit provided on both of the camera section and the base, and it is necessary to transfer a picked up image signal, a control signal, power supply and so forth between the electric circuits of the camera section and the base.

In the past, a slip ring having a fixed terminal and a movable terminal which rotates relative to and in contact with the fixed terminal is provided between the base and a case such that a picked up image signal, a control signal, power supply and so forth are transferred through the slip ring.

The slip ring is not limited in the angle of rotation but is disadvantageous where it is tried to achieve enhancement of the durability because friction occurs between the fixed terminal and the movable terminal. Further, since the fixed terminal and the movable terminal are formed from an expensive metal material, the slip ring is disadvantageous where it is tried to achieve reduction of the cost.

Therefore, it has been proposed to electrically connect the electric circuit of the camera section and the electric circuit of the base to each other using a wiring line member having flexibility and lay an intermediate portion of the wiring line member with a clearance around the imaginary axis.

With the configuration just described, since the wiring line member has a clearance, even if the case rotates within a predetermined range of rotation with respect to the base, no stress is applied to the wiring line member. However, if a malfunction occurs such that, for example, the case rotates by three or four rotations, then stress is applied to the wiring line member.

Therefore, engaging projections serving as stoppers are provided at locations of the base and the case on an equal radius around the imaginary axis such that they are abutted with each other in a circumferential direction around the imaginary axis to restrict the range of rotation of the case.

SUMMARY OF THE INVENTION

However, where the engaging projection of the base and the engaging projection of the frame are abutted with each other to restrict the range of rotation of the case as described above, from this structure, the range of rotation of the case with respect to the base is limited to less than 360 degrees.

Therefore, if it is necessary to cause the case by more than 360 degrees with respect to the base, a slip ring must be used. This is disadvantageous when it is tried to achieve enhancement of the durability and reduction of the cost.

Accordingly, it is desirable to provide an electronic apparatus which is advantageous where it is tried to achieve enhancement of the durability and reduction of the cost.

According to an embodiment of the present invention, there is provided an electronic apparatus including a first member, a second member provided on the first member for rotation in a first direction which is a circumferential direction around a first imaginary axis which passes the first member and a second direction reverse to the first direction, and a stopper mechanism for defining a range of rotation of the second member around the first imaginary axis. The stopper mechanism includes a first stopper provided on the first member and a second stopper provided on the second member for integral rotation with the second member. The first stopper has first and second stopping portions individually movable between a retracted position and an abutting position. The first stopper being moved, when the first stopping portion is abutted by the second stopper which revolves in the first direction in a first state wherein the first stopping portion is positioned at the abutting position and the second stopping portion is positioned at the retracted position, to establish a second state wherein the first stopping portion is positioned at the retracted position and the second stopping portion is positioned at the abutting position, the first stopper being blocked, when the second stopping portion is abutted by the second stopper which revolves in the first direction in the second state, against movement to stop further rotation of the second member, the first stopper being moved, when the second stopping portion is abutted by the second stopper which moves in the second direction in the second state, to establish the first state, the first stopper being blocked, when the first stopping portion is abutted by the second stopper which revolves in the second direction in the first state, against movement to stop further rotation of the second member.

According to another embodiment of the present invention, there is provided an electronic apparatus including a first member, a second member provided on the first member for rotation in a first direction which is a circumferential direction around a first imaginary axis which passes the first member and a second direction reverse to the first direction, and a stopper mechanism for defining a range of rotation of the second member around the first imaginary axis. The stopper mechanism includes first and second slide members provided on the first member and a stopper provided on the second member for integral rotation with the second member. The first and second slide members selectively move between a retracted position and an abutting position. The first and second slid members being moved, when the fist slide member is abutted by the stopper which rotates in the first direction in a first state wherein the first slide member is positioned at the abutting position and the second slid member is positioned at the retracted position, to establish a second state wherein the first slid member is positioned at the retracted position and the second slid member is positioned at the abutting position, the first and second slide members being blocked from movement, when the second slide member is abutted by the stopper which rotates in the first direction in the second state, to stop the rotation of the second member, the second slide member being moved, when the second slide member is abutted by the stopper which rotates in the second direction in the second state, to establish the first state, the first and second slide members being blocked from movement, when the first slide movement is abutted by the stopper which rotates in the second direction in the first state, to stop the rotation of the second members.

With the electronic apparatus, the range of rotation of the second member with respect to the first member can be restricted or defined within a range greater than 360 degrees with a simple and compact configuration without using a slip

Figure 1:
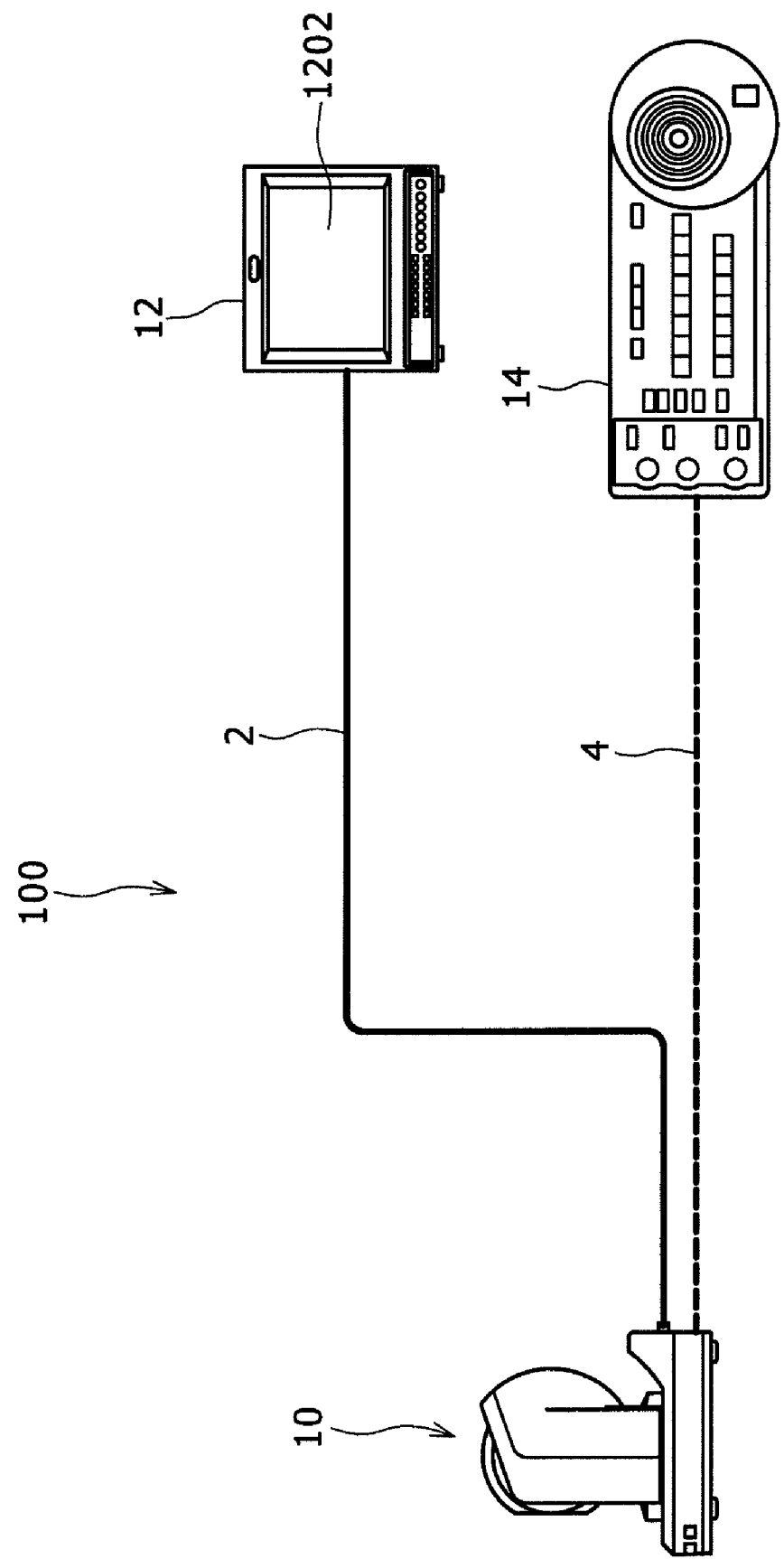
FIG. 1 is a schematic view showing a camera system which includes a camera apparatus according to a first embodiment of the present invention.

DETAILED DESCRIPTION OF THE PREFERRED EMBODIMENTS (First Embodiment)

Now, embodiments of the present invention will be described in detail below, referring to the drawings.

Referring first to FIG. 1, there is shown a camera system which includes a camera apparatus to which the present invention is applied. The camera apparatus 10 is connected to a monitor 12 and a remote controller 14 so that it is remotely controlled. The camera apparatus 10, the monitor 12 and the remote controller 14 compose the camera system 100.

The monitor 12 receives a video signal picked up by the camera apparatus 10 and supplied thereto from the camera apparatus 10 through a cable 2 to display an image on a display screen 1202 thereof.

The remote controller 14 supplies an operation signal to the camera apparatus 10 through another cable 4 to remotely control the camera apparatus 10.

Figure 2:
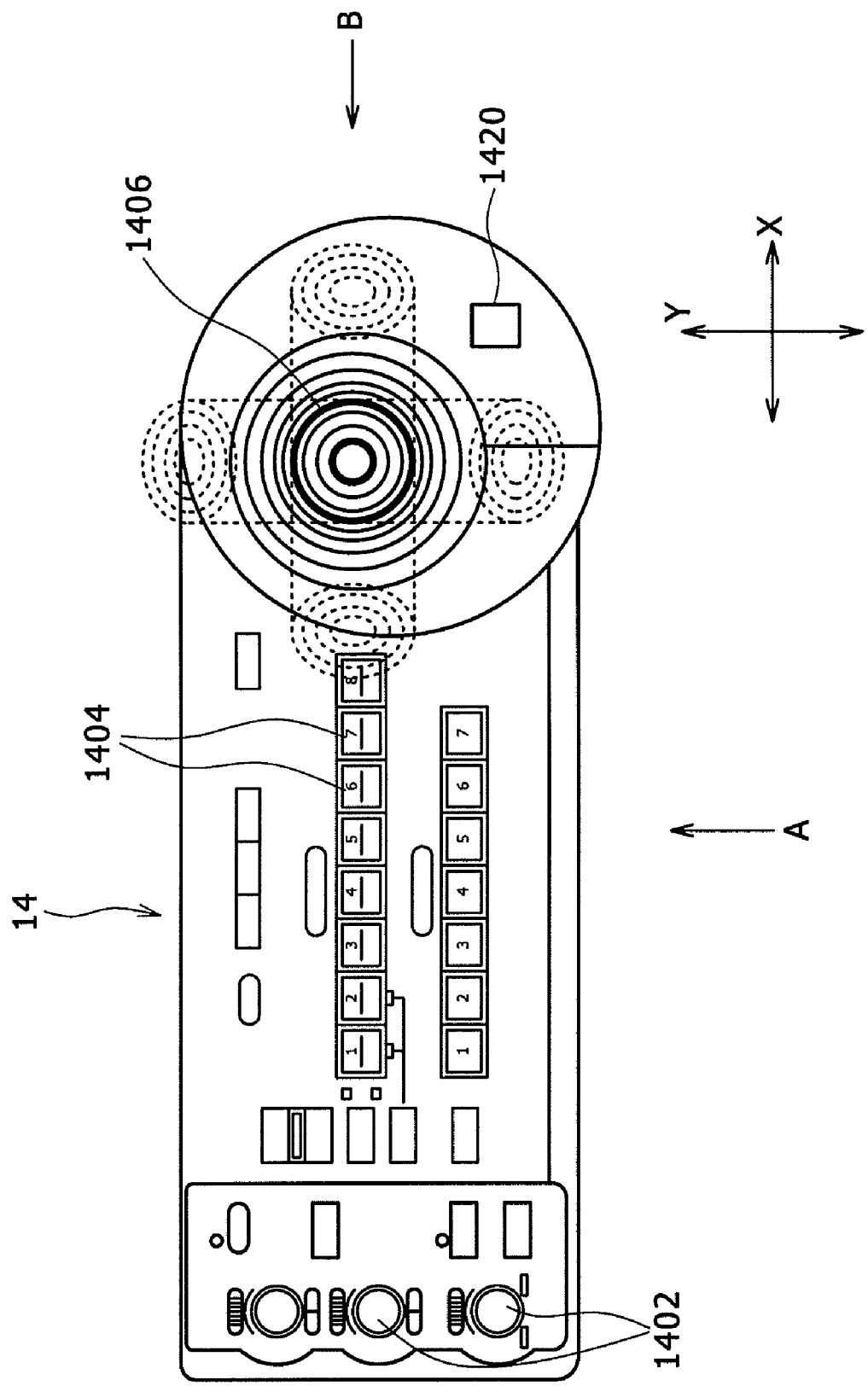
FIG. 2 is a plan view of a remote controller used in the camera system.
Figure 3:
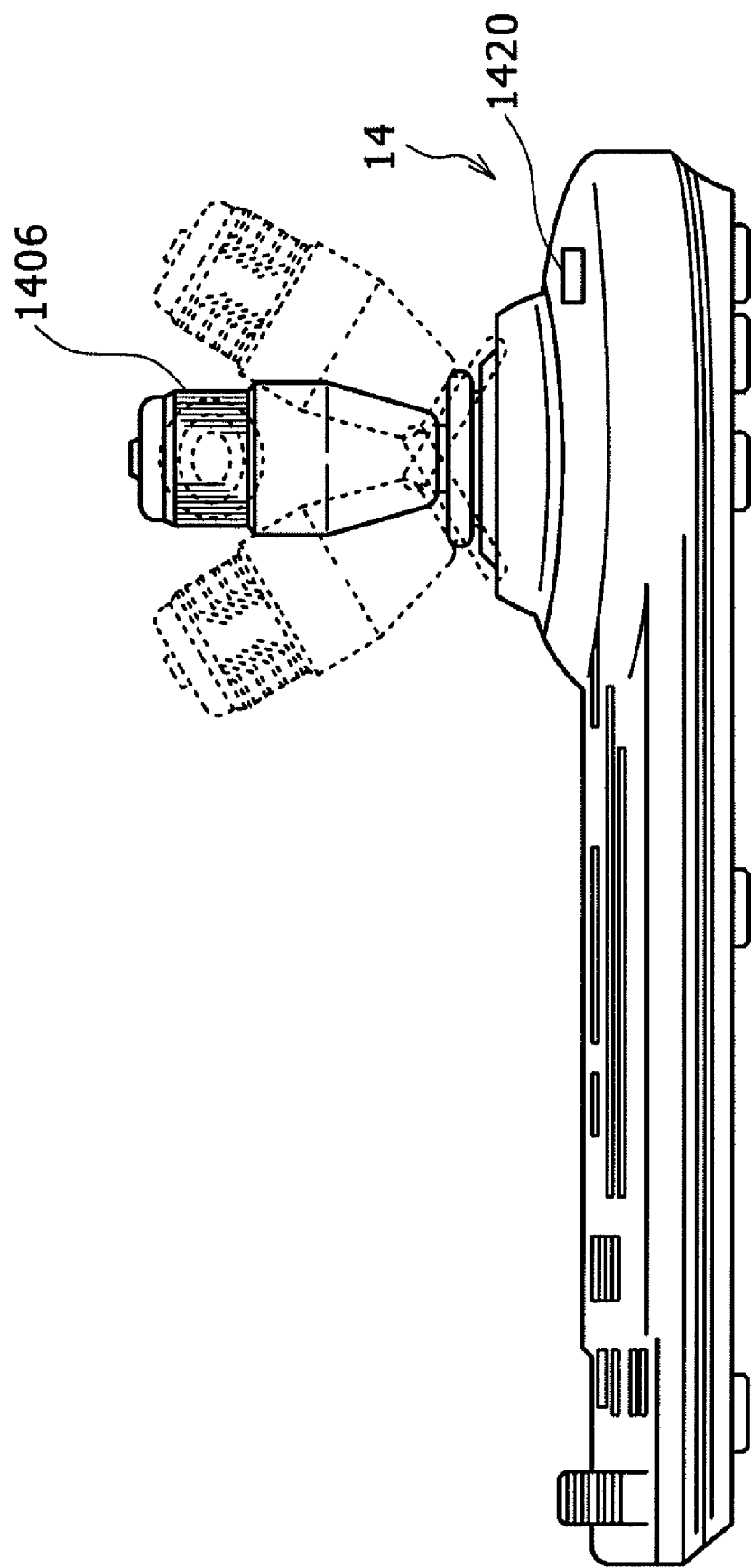
FIGS. 3 and 4 are views as viewed in the directions of arrow marks A and B of FIG. 2, respectively.
Figure 4:
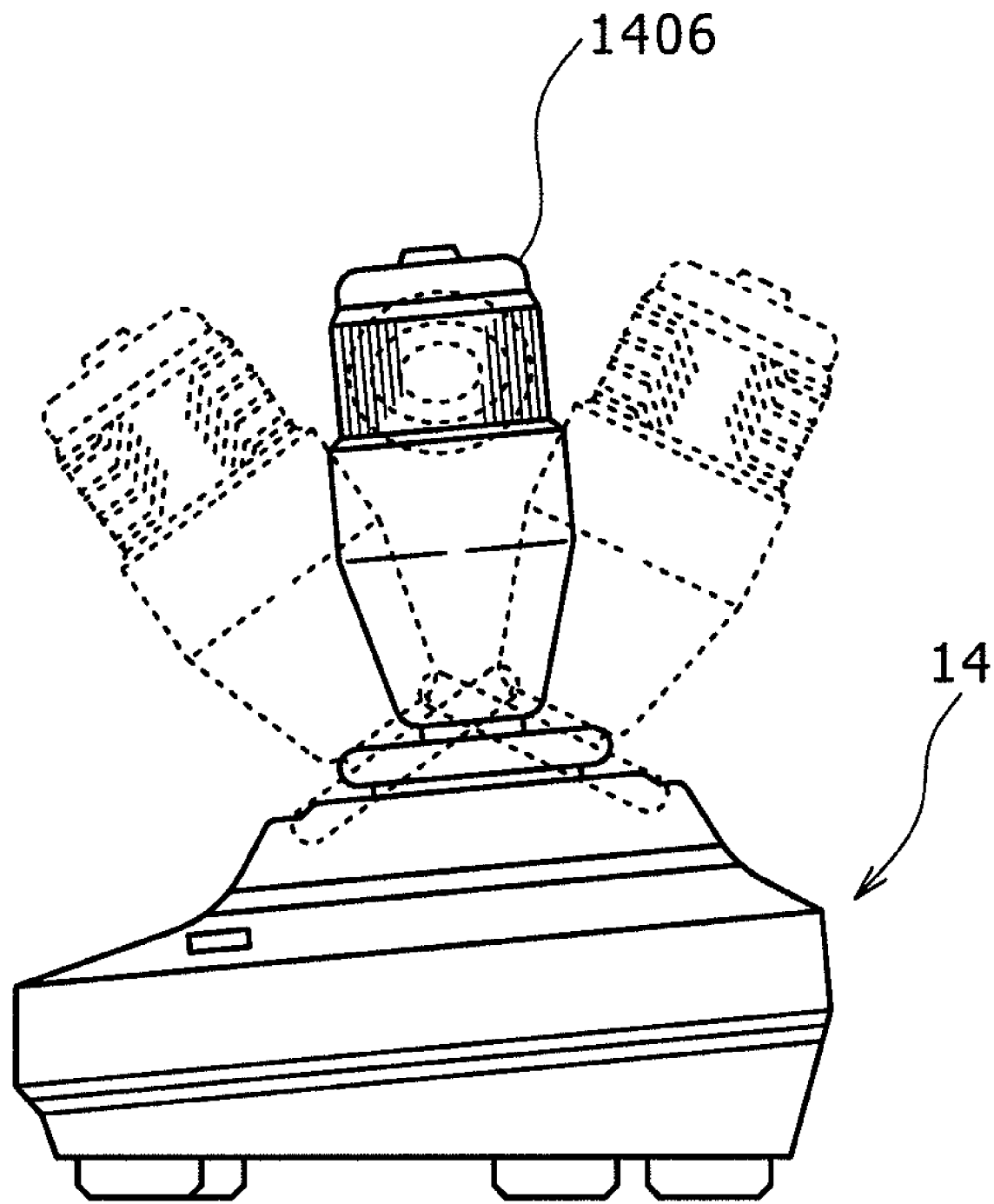

The remote controller 14 is particularly shown in FIGS. 2 to 4. Referring to FIGS. 2 to 4, the remote controller 14 includes a plurality of operation members including a plurality of operation knobs 1402, a plurality of operation switches 1404 and a joystick 1406.

If any of the operation members is operated, then the remote controller 14 supplies a corresponding operation signal to the camera apparatus 10.

Here, an operation of any of the operation members is a rotating operation of any operation knobs 1402, a depression operation of any operation switch 1404 or a rotating operation and/or a rocking operation of the joystick 1406.

Now, the camera apparatus 10 is described with reference to FIGS. 5 to 18.

Figure 5:
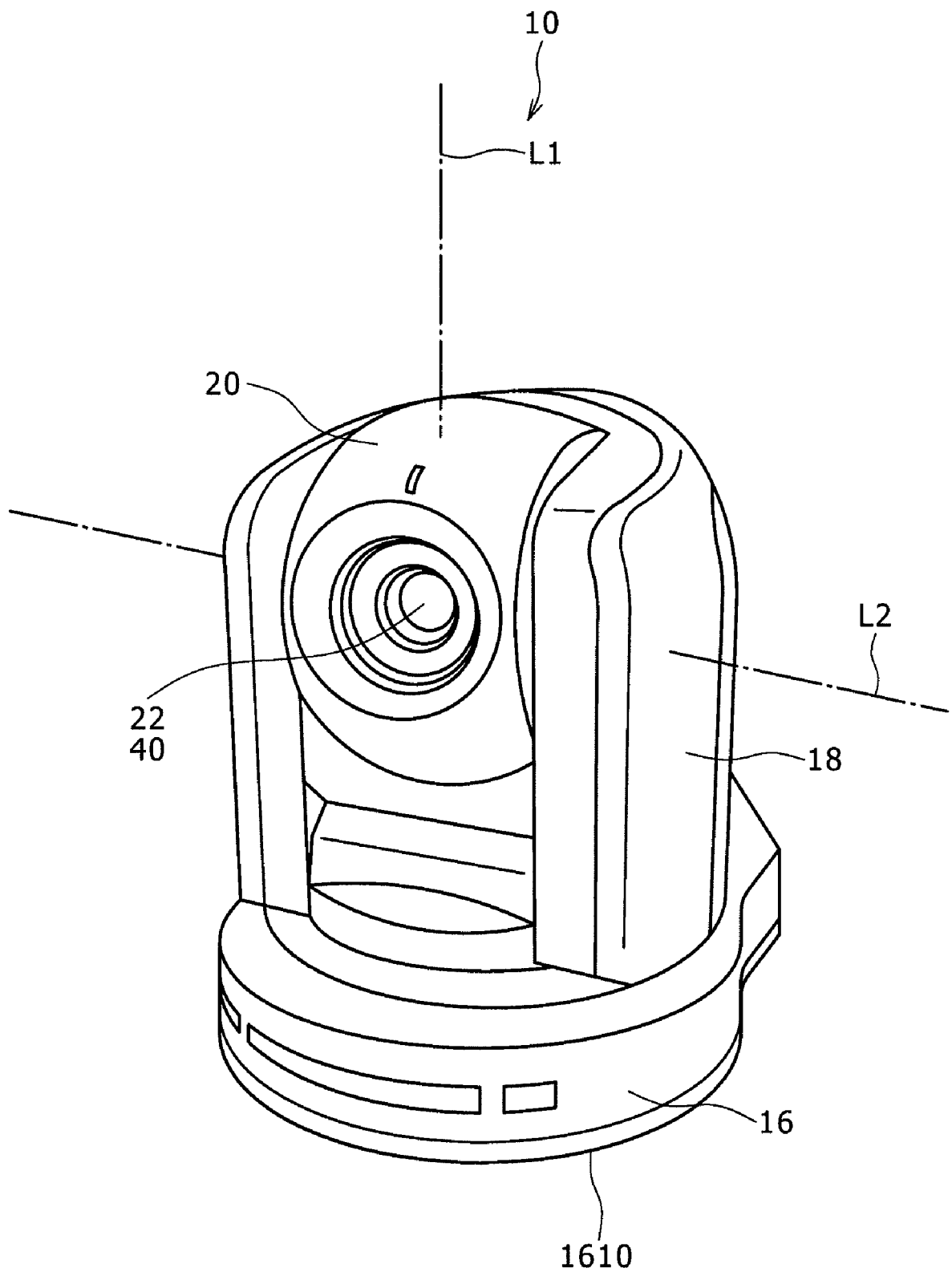
FIG. 5 is a perspective view of the camera apparatus.
Figure 10:
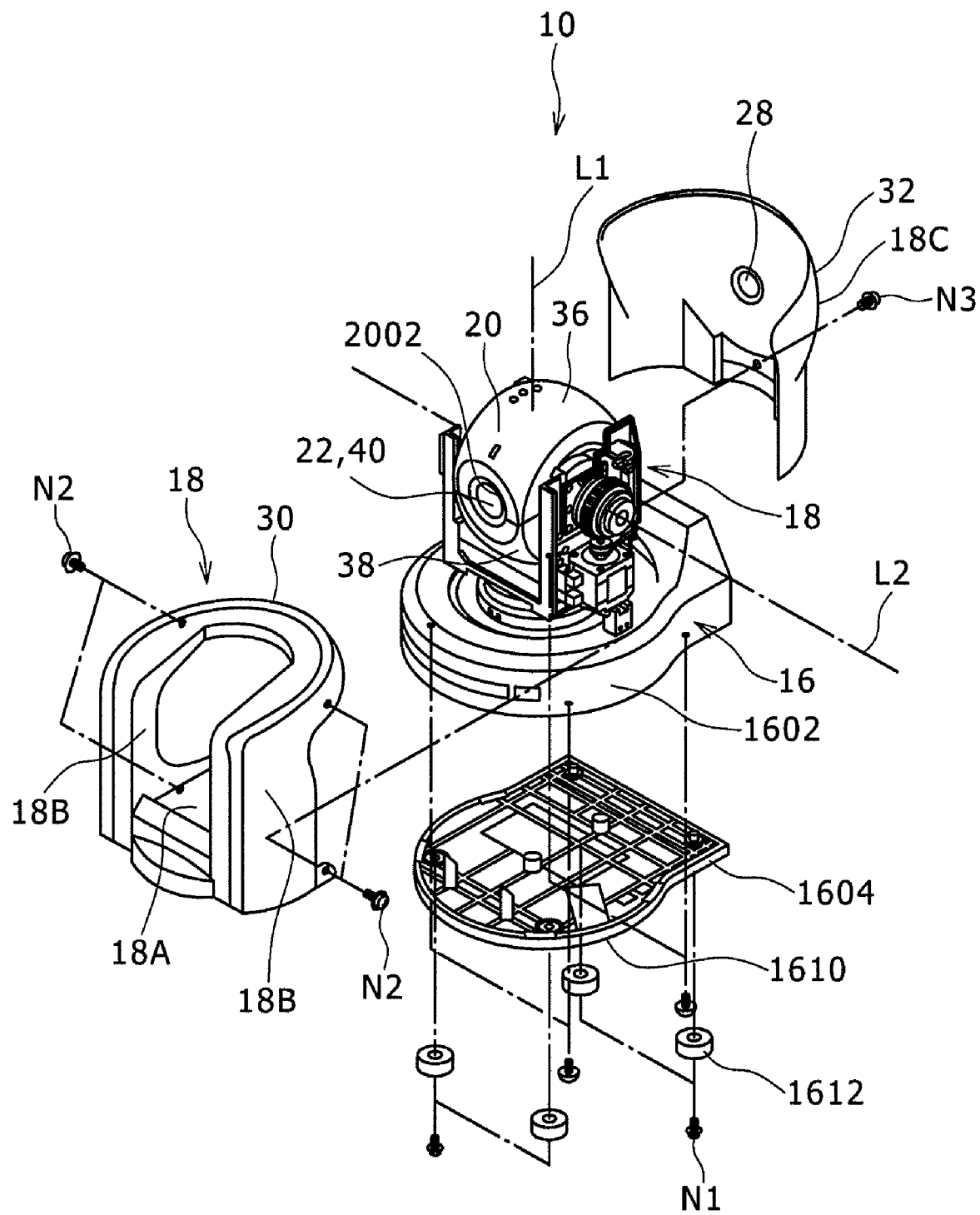
FIG. 10 is an exploded perspective view of the camera apparatus.

Referring first to FIG. 5, the camera apparatus 10 includes a base 16, an outer case 18, an inner case 20, a camera section 22, a first driving section 24 (FIG. 14), a second driving section 26 (FIG. 12) and a conversion lens 28 (FIG. 10).

The outer case 18 is supported for rotation on the base 16 around a first imaginary axis L1 which passes the base 16.

The inner case 20 is mounted for rotation on the inner side of an upper portion of the outer case 18 around a second imaginary axis L2 extending on a plane intersecting with the first imaginary axis L1, in the present embodiment, on a plane perpendicular to the first imaginary axis L1.

The camera section 22 is accommodated in the inner case 20.

The camera apparatus 10 is used, for example, with a bottom face 1610 of the base 16 thereof attached to a mounting face such as an upper face of a table or a ceiling face. In this instance, the first imaginary axis L1 extends in the vertical direction while the second imaginary axis L2 extends in a horizontal direction.

(Base 16)

Referring to FIG. 10, the base 16 includes a flattened base body 1602 and a bottom plate 1604. The base body 1602 has a height, a leftward and rightward width of a dimension greater than that of the height and a forward and backward length of a dimension greater than that of the width. The bottom plate 1604 is attached to a lower face of the base body 1602 by screws N1 and forms the bottom face 1610 of the base 16.

Rubber legs 1612 are provided at four corners of the bottom face 1610 of the base 16.

Figure 9:
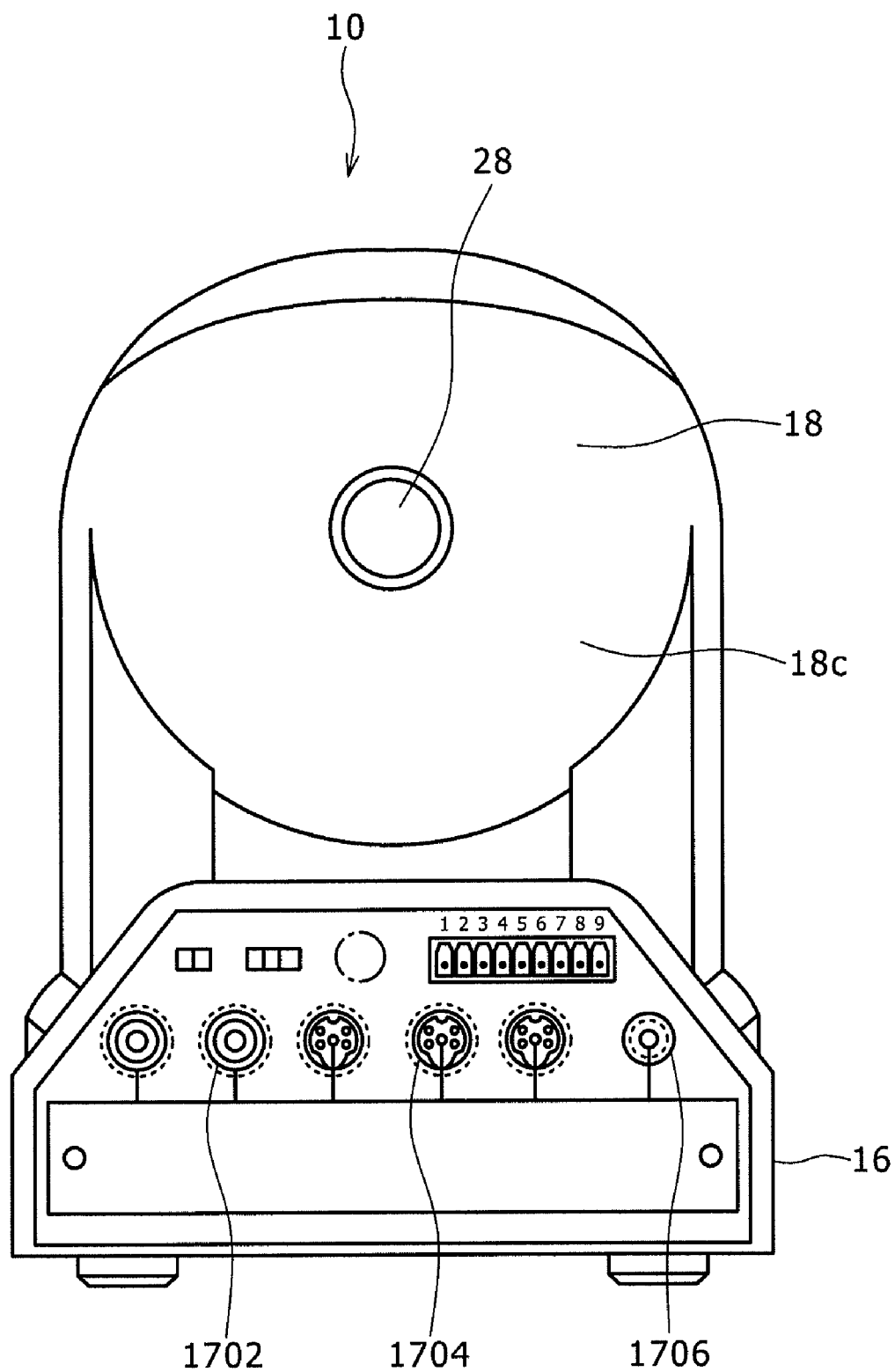
FIG. 9 is a view as viewed in the direction of an arrow mark C of FIG. 7.

Referring now to FIG. 9, a plurality of connection terminals including a video terminal 1702, a communication terminal 1704 and a power supply input terminal 1706 are provided on a rear face of the base 16.

The video terminal 1702 is connected to the monitor 12 (FIG. 1) by the cable 2 to supply a video signal to the monitor 12.

The communication terminal 1704 is connected to the remote controller 14 (FIG. 1) by the cable 4 to transfer a control signal to and from the remote controller 14 based on predetermined interface specifications.

The power supply input terminal 1706 receives a dc power supply through a power supply cable not shown.

(Outer Case 18)

Figure 7:
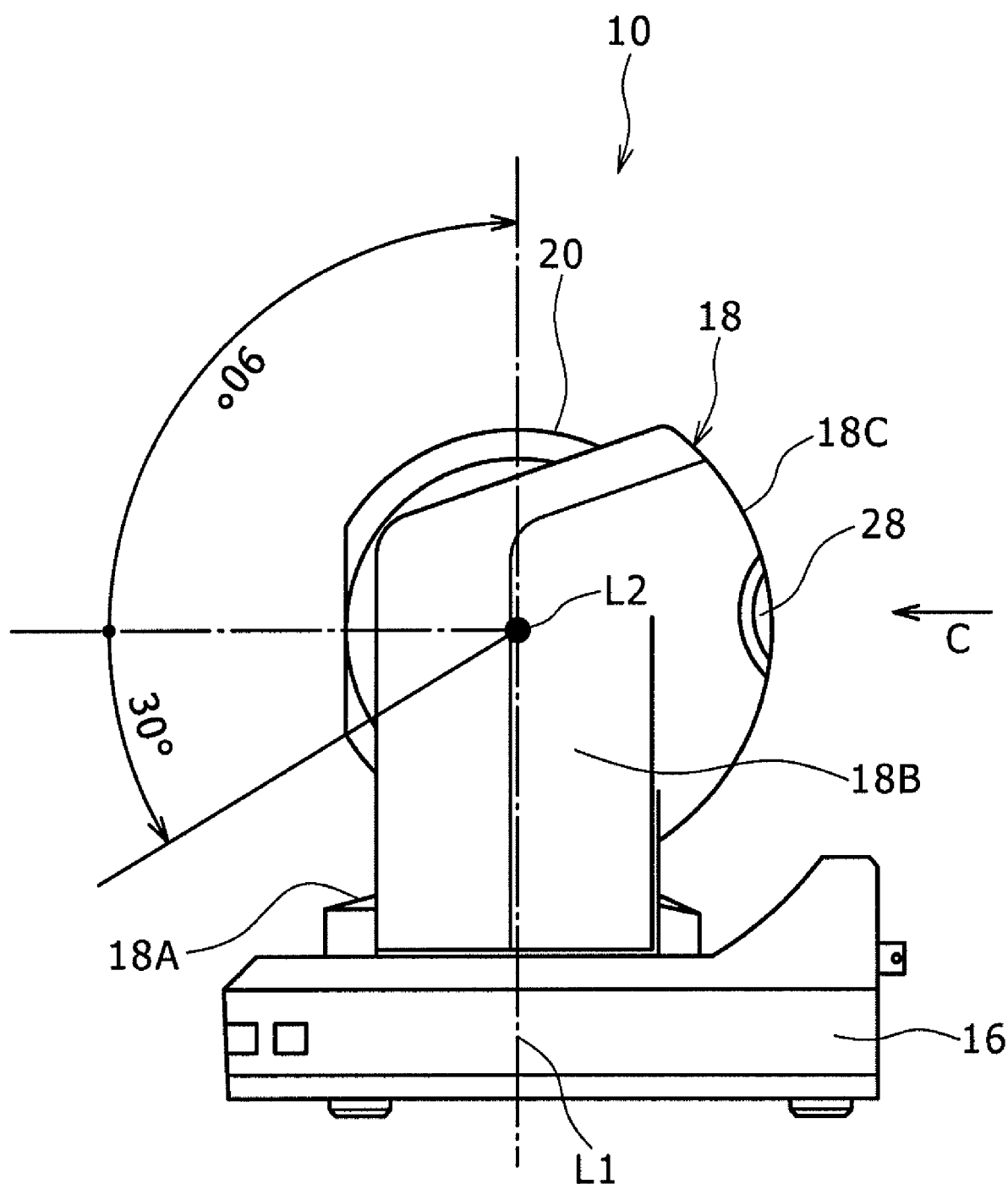
FIGS. 7 and 8 are views as viewed in the directions of arrow marks A and B of FIG. 6, respectively.

Referring to FIG. 7, the outer case 18 includes a base portion 18A opposing to the base 16, a pair of left and right side portions 18B erected uprightly from the opposite left and right sides of the base portion 18A, and a rear portion 18C for connecting rear races of the left and right side portions 18B to each other.

Referring to FIG. 10, in the present embodiment, the base portion 18A and an upper portion of the rear portion 18C are integrated to form a front segment 30.

Meanwhile, the remaining portion of the rear portion 18C except the upper portion is formed as a rear segment 32.

In other words, the outer case 18 is composed of two members of the front segment 30 and the rear segment 32.

Figure 11:
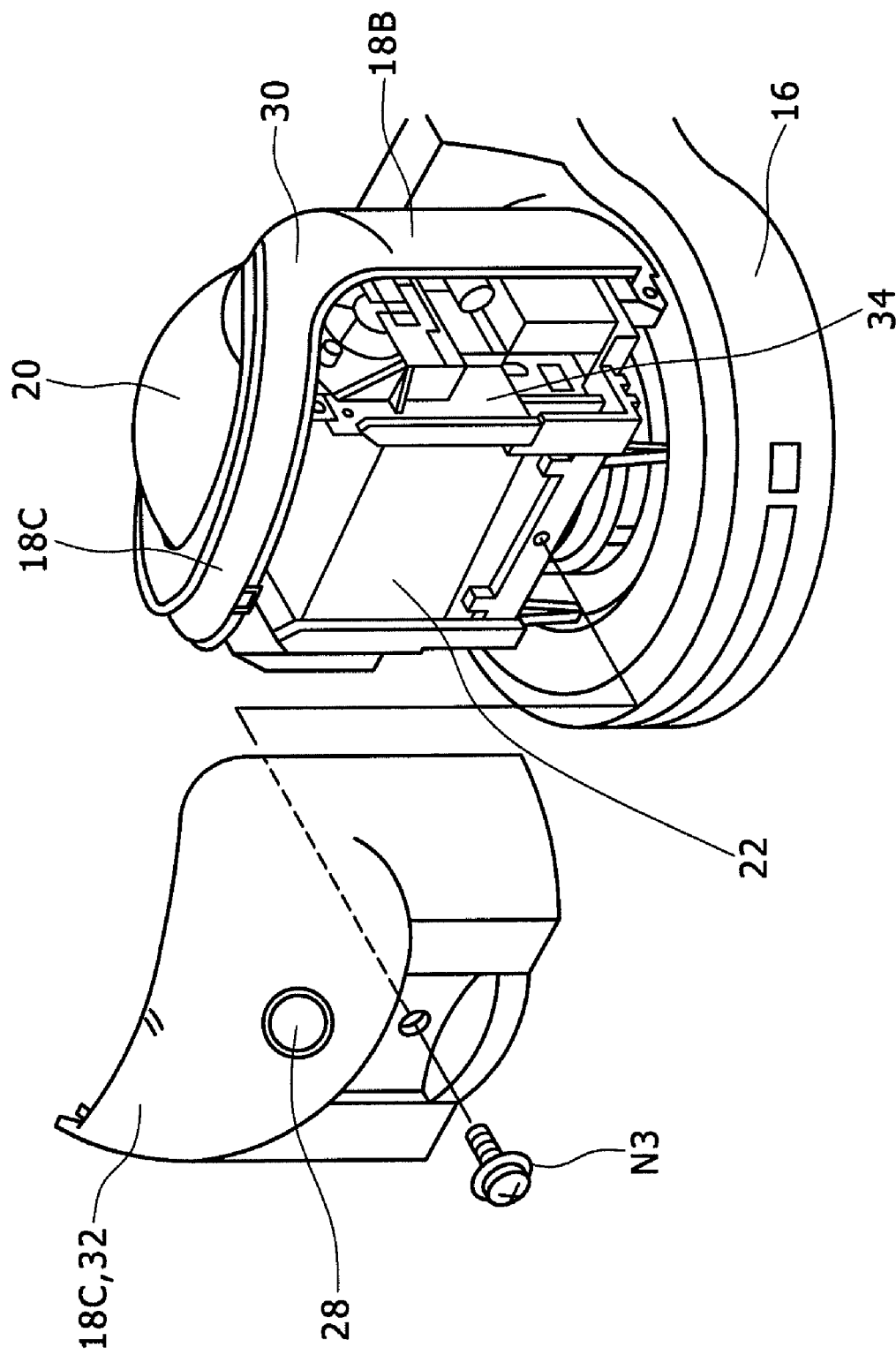
FIG. 11 is a perspective view of the camera apparatus with a rear segment removed.

Referring to FIG. 11, the outer case 18 is attached to a frame 34 such that it is disposed on the base 16.

Figure 13:
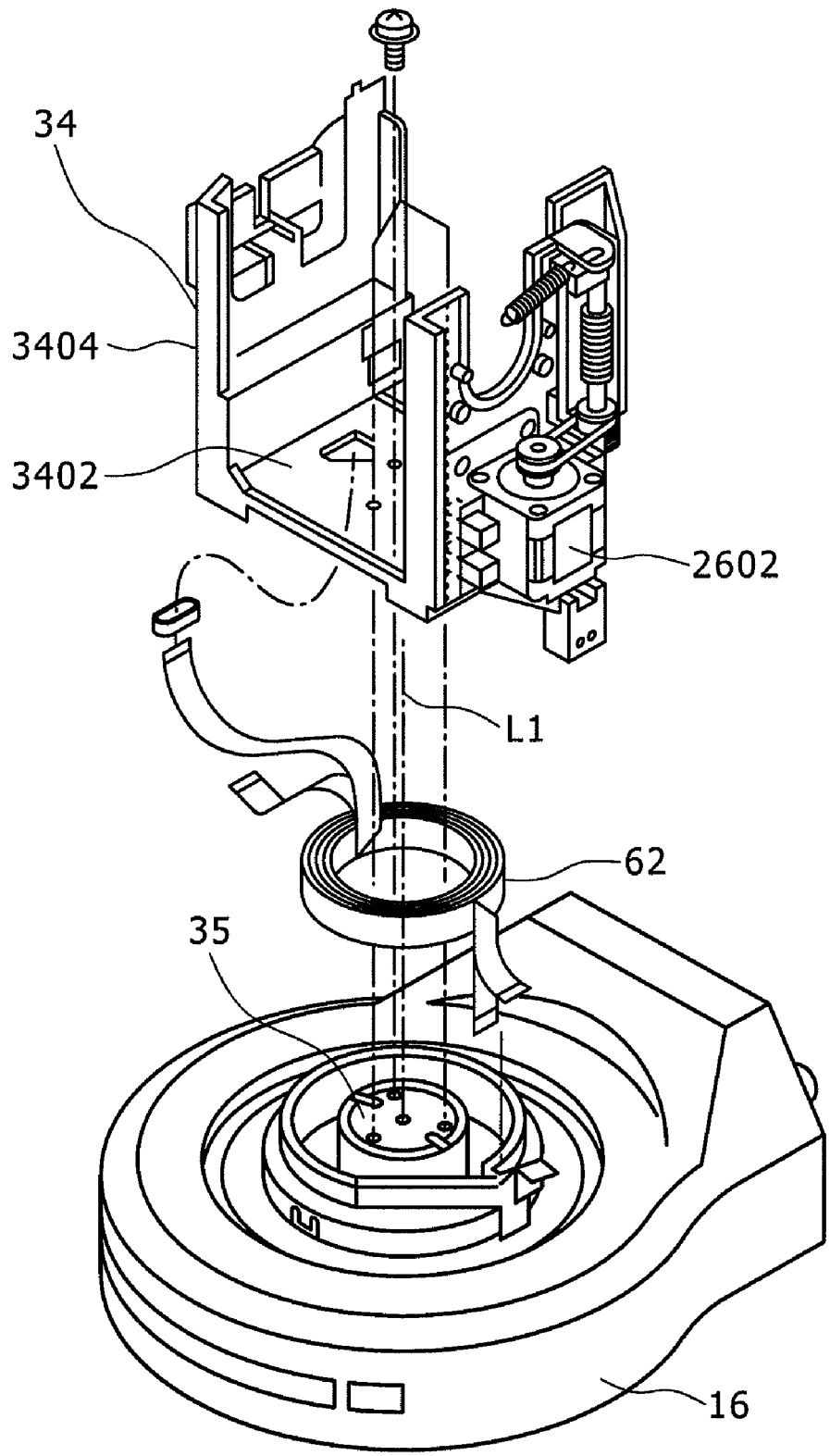
FIG. 13 is a perspective view of the outer case, the base and a lead wire of the camera apparatus.

Referring to FIG. 13, the frame 34 is mounted for rotation on the base 16 around the first imaginary axis L1 through a bearing mechanism 35.

Figure 12:
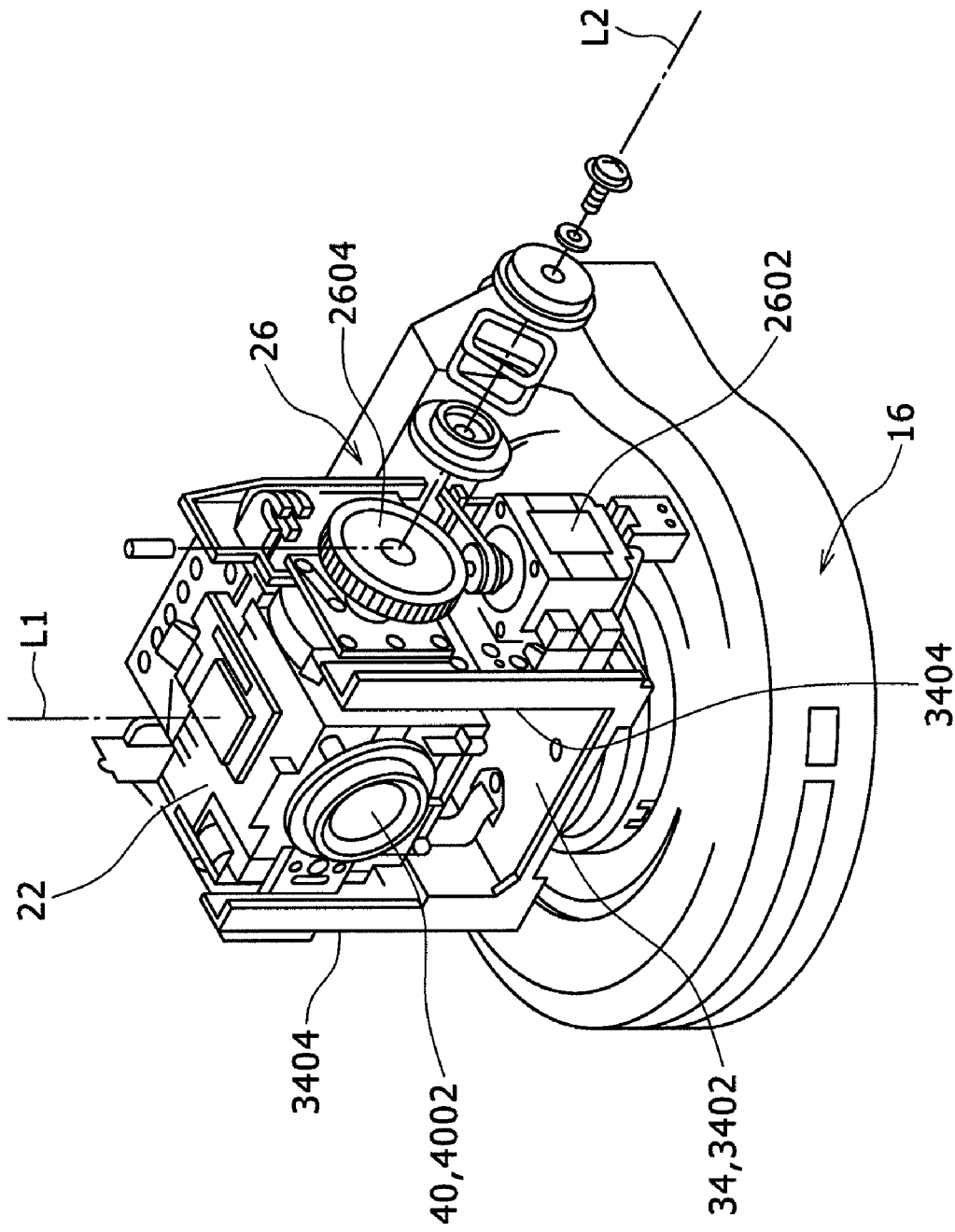
FIG. 12 is a perspective view showing the base, an outer case and an inner case of the camera apparatus.

Referring to FIG. 12, the frame 34 includes a base plate portion 3402 extending on the base 16 and a pair of side plate portions 3404 erected uprightly from the opposite sides of the base plate portion 3402.

Referring to FIGS. 10, 11 and 12, the outer case 18 is attached to the frame 34 by screws N2 and N3 such that it covers the base plate portion 3402 with the base portion 18A thereof, covers the side plate portions 3404 on the opposite sides with the left and right side portions 18B and covers a rear portion between the side plate portions 3404 on the opposite sides with a rear portion 18C thereof.

(Inner Case 20)

Referring to FIG. 10, the inner case 20 is composed of two members including an upper segment 36 opposing to the base 16 and a lower segment 38 opposing to the opposite side to the base 16.

The inner case 20 is attached to the camera section 22 by screws not shown such that it covers an upper portion of the camera section 22 with the upper segment 36 thereof between the left and right side plate portions 3404 of the frame 34 and covers a lower portion of the camera section 22 with the lower segment 38 thereof.

In particular, the inner case 20 is attached to the camera section 22 shown in FIG. 12 such that it is disposed between upper portions of the left and right side portions 18B of the outer case 18. In other words, the camera section 22 is incorporated in the inner case 20 and covered with the inner case 20, and the inner case 20 moves integrally with the camera section 22.

Figure 6:
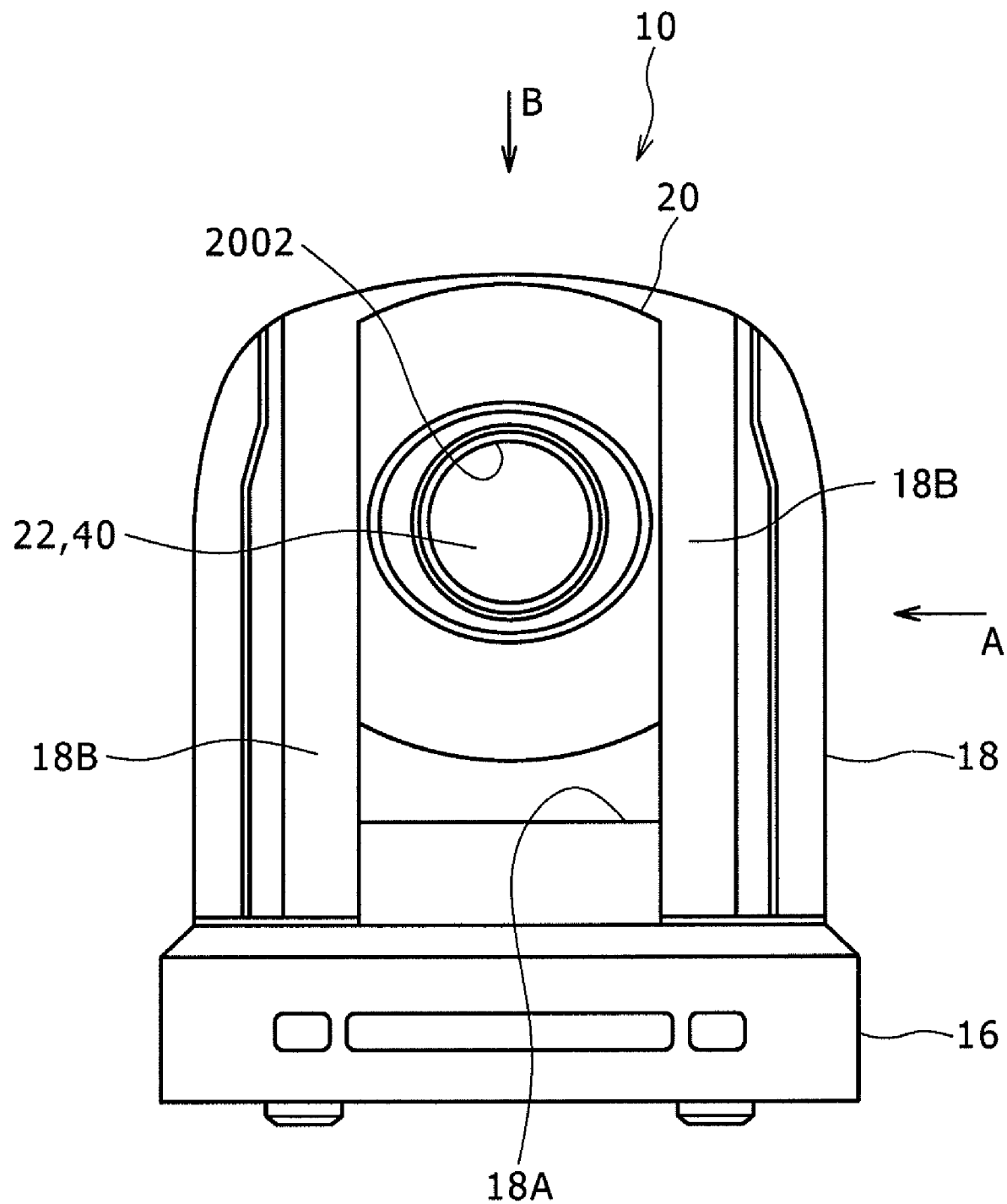
FIG. 6 is a front elevational view of the camera apparatus.

Referring to FIG. 6, the inner case 20 has an opening 2002 formed therein such that, when the inner case 20 is attached to the camera section 22, an image pickup optical system 40 of the camera section 22 is exposed to the outside through the opening 2002. The opening 2002 is positioned at the center between the left and right side portions 18B.

(Camera Section 22)

Referring to FIG. 12, the camera section 22 is disposed between the left and right side plate portions 3404 of the frame 34 and coupled at the opposite end portions thereof for rotation around the second imaginary axis L2 on the left and right side plate portions 3404.

Figure 15:
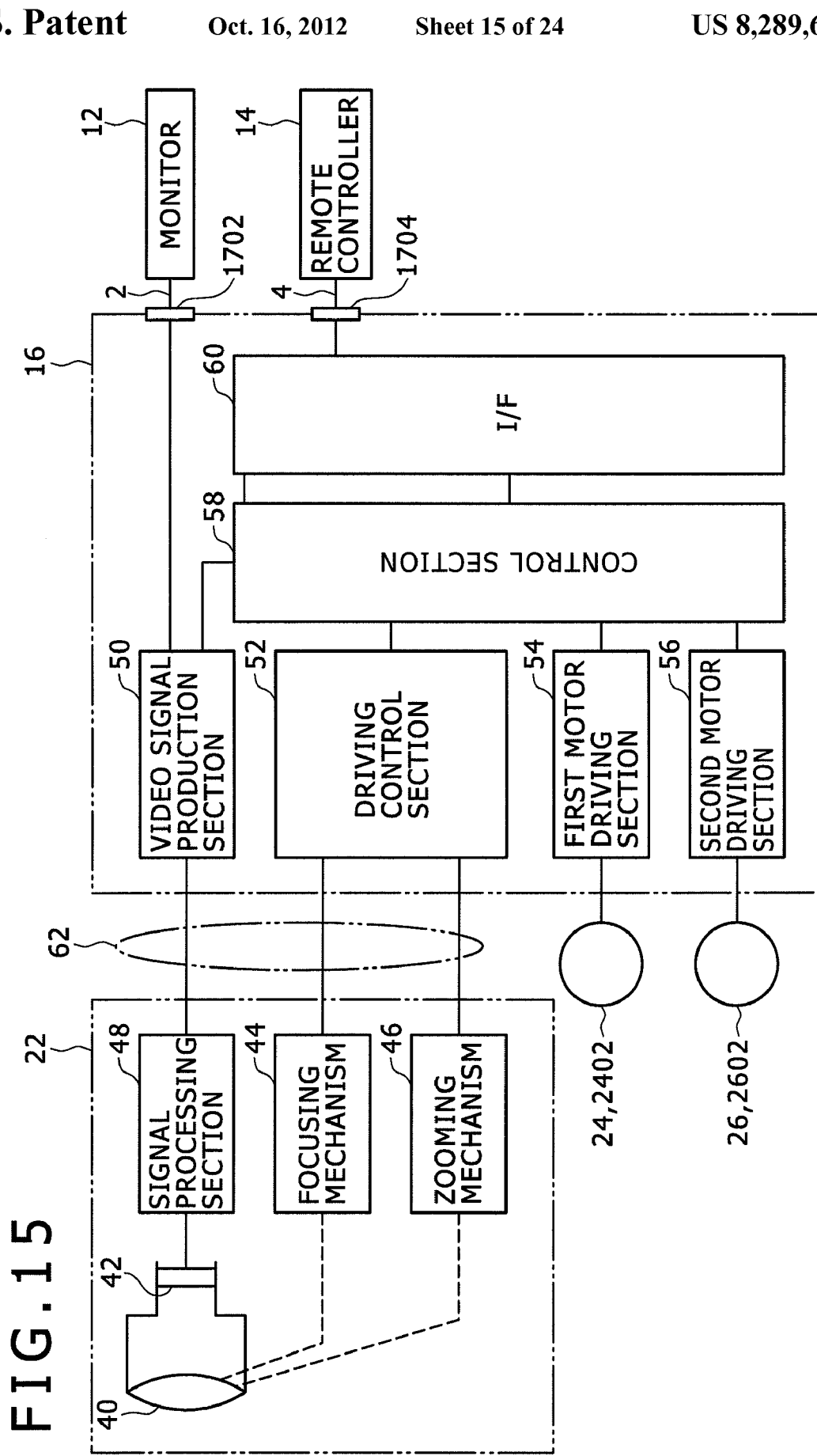
FIG. 15 is a block diagram showing a configuration of a control system of the camera apparatus.

Referring to FIG. 15, the camera section 22 includes the image pickup optical system 40 for catching an image of an image pickup object, and an image pickup device 42 for picking up an image of the image pickup object introduced by the image pickup optical system 40 to produce a picked up image signal.

An objective lens 4002 (FIG. 12) is positioned on the side of the image pickup optical system 40 nearest to the image pickup object.

The image pickup optical system 40 includes a focusing mechanism 44 for moving a focusing lens of the image pickup optical system 40 to carry out a focusing movement and a zooming mechanism 46 for moving a zoom lens of the image pickup optical system 40 to carry out a zooming movement.

In the present embodiment, the image pickup optical system 40 has a zoom ratio of one to 20 times.

Further, the camera section 22 includes a signal processing section 48 for carrying out a predetermined signal process for a picked up image signal to produce a video signal.

In other words, the frame 34 includes, as a second electric equipment section, the image pickup device 42, focusing mechanism 44, zooming mechanism 46 and so forth.

(First Driving Section 24)

Figure 14:
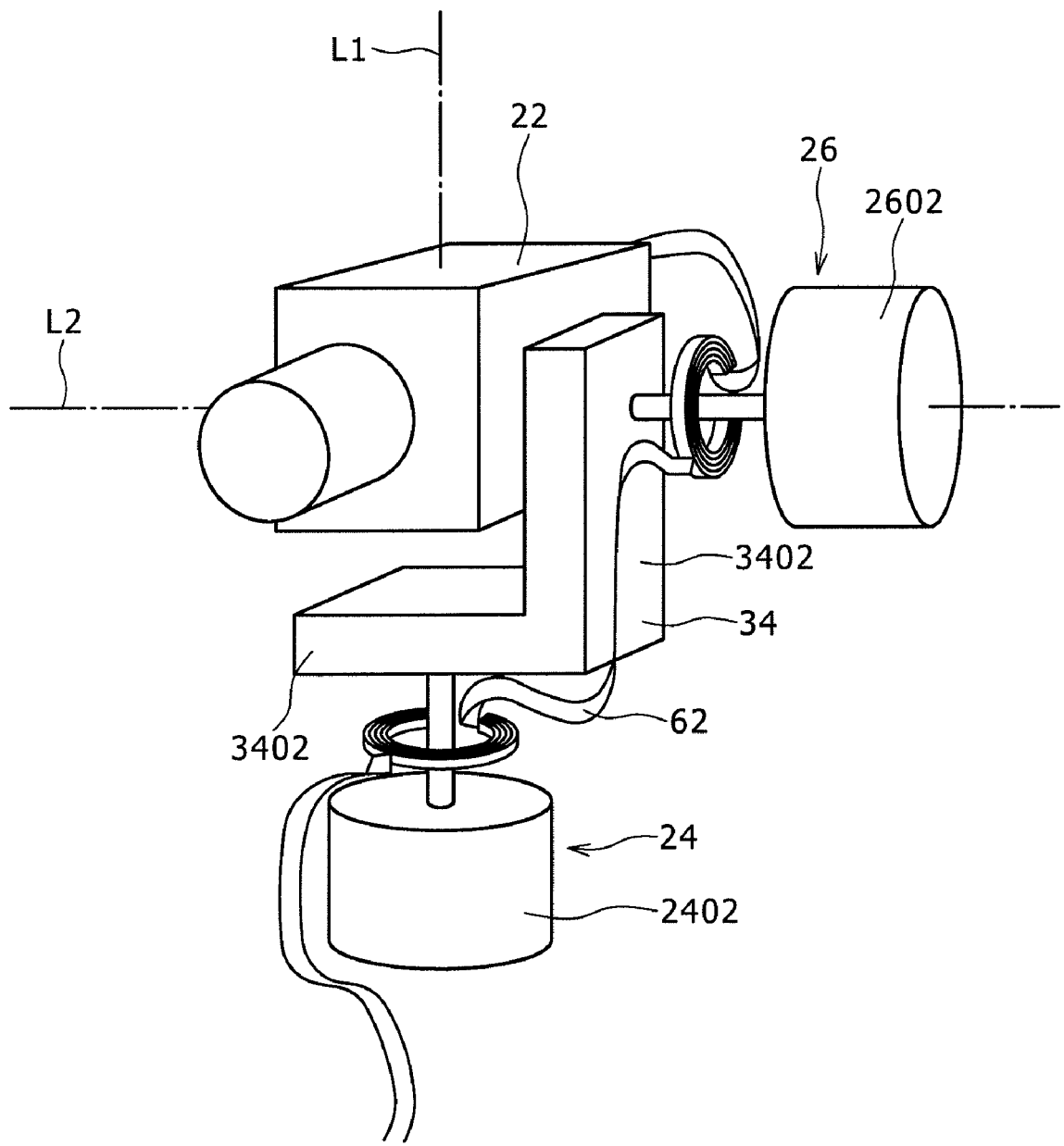
FIG. 14 is a perspective view showing a configuration of first and second driving sections of the camera apparatus.

Referring to FIG. 14, the first driving section 24 rotates the frame 34 around the first imaginary axis L1 with respect to the base 16 to rotate the base 16 around the first imaginary axis L1, that is, to turn the base 16 in a panning direction.

The first driving section 24 includes, for example, a first motor 2402, a transmission mechanism not shown for transmitting rotational driving force of the first motor 2402 to the frame 34, and so forth. Various existing known mechanisms including a gear mechanism or an endless belt can be adopted for such a transmission mechanism as just described.

The first motor 2402 and the transmission mechanism which compose the first driving section 24 are accommodated in the inside of the base 16.

(Second Driving Section 26)

Referring to FIG. 14, the second driving section 26 rotates the camera section 22 around the second imaginary axis L2 with respect to the frame 34 to rotate the inner case 20 around the second imaginary axis L2, that is, to turn the camera section 22 in a tilting direction.

The second driving section 26 includes, for example, a second motor 2602, a transmission mechanism 2604 (FIG. 12) for transmitting rotational driving force of the second motor 2602 to the camera section 22, and so forth. Various existing known mechanisms including a gear mechanism including a worm and a worm wheel, an endless belt or the like can be used for the transmission mechanism 2604.

The second motor 2602 and the transmission mechanism 2604 which compose the second driving section 26 are accommodated in the inside of the inner case 20.

(Control System)

Now, a control system of the camera apparatus 10 is described.

Referring to FIG. 15, a video signal production section 50, a driving control section 52, a first motor driving section 54, a second motor driving section 56, a control section 58, an interface 60 and so forth are provided on the base 16 as first electric equipment.

The video signal production section 50 carries out various signal processes for a video signal supplied thereto from the signal processing section 48 to produce a video signal of a predetermined format.

Further, in the present embodiment, since the conversion lens 28 is a very wide angle lens, that is, a fish-eye lens, an image picked up when the conversion lens 28 is used suffers from distortion. Accordingly, the video signal production section 50 carries out image processing of correcting such distortion so that a plain image can be displayed on the monitor 12.

The driving control section 52 supplies a driving signal to the focusing mechanism 44 and the zooming mechanism 46 so that the focusing mechanism 44 and the zooming mechanism 46 may operate.

The first motor driving section 54 supplies a driving signal to the first motor 2402 to carry out rotational control of the first motor 2402.

The second motor driving section 56 supplies a driving signal to the second motor 2602 to carry out rotational control of the second motor 2602.

The control section 58 controls the video signal production section 50, driving control section 52, first motor driving section 54 and second motor driving section 56 in accordance with a control signal supplied thereto from the remote controller 14 through the interface 60.

In particular, the control section 58 controls the video signal production section 50 in accordance with a control instruction regarding a video image supplied thereto from the remote controller 14 to carry out starting and stopping of supply of a video signal and various working processes for a video signal.

Further, the control section 58 controls the driving control section 52 in accordance with a control instruction regarding a focusing operation or a zooming operation supplied thereto from the remote controller 14.

Furthermore, the control section 58 controls the first motor driving section 54 and the second motor driving section 56 in accordance with a control signal regarding a panning movement or a tilting movement supplied thereto from the remote controller 14.

The interface 60 carries out communication control between the control section 58 and the remote controller 14 in accordance with a predetermined communication protocol.

The video signal supplied from the video signal production section 50 is provided to the monitor 12.

Lead wires 62 transmit a video signal, a driving signal, power and so forth between the camera section 22 and the base 16 therethrough.

In particular, the lead wires 62 form wiring line members for transferring a signal or wiring line members for transmitting a signal and power supply between the first electric equipment section of the base 16 and the second electric equipment section of the frame 34. Such wiring line members may be a cable or an optical fiber.

In the present embodiment, the lead wires 62 are formed as a flexible cable as seen in FIGS. 13 and 14 and are laid with a clearance around the first imaginary axis L1. Therefore, even if the frame 34 rotates around the first imaginary axis L1 with respect to the base 16, excessively high force is not applied to the lead wires 62.

(Conversion Lens 28)

Referring to FIGS. 7, 9, 10 and 11, the conversion lens 28 is provided at an upper portion of the rear segment 32.

The conversion lens 28 functions while it is disposed forwardly of the image pickup optical system 40.

The conversion lens 28 varies the focal distance of the optical system including the image pickup optical system 40 and the conversion lens 28 toward the wide angle end side or the telephoto end side with respect to the focal distance solely of the image pickup optical system 40. In other words, the conversion lens 28 varies the zoom ratio and the angle of view of the optical system where it includes only the image pickup optical system 40.

In the present embodiment, a wide conversion lens is used as the conversion lens 28. More particularly, a very wide angle lens, that is, a fish-eye lens having an optical magnification of 0.24 times and an angle of 180 degrees thereat subtended by a diagonal line of the screen, is used as the conversion lens 28.

Since the zoom ratio of the image pickup optical system 40 is one to 20 times as described hereinabove, the zoom ratio of the entire optical system where the conversion lens 28 is used is 0.24 to approximately four times.

The conversion lens 28 is provided such that, when the camera section 22 rotates around the second imaginary axis L2 together with the inner case 20 until the inner case 20 is positioned at a conversion lens use position, the center of the conversion lens 28 is aligned with the optical axis of the image pickup optical system 40 of the camera section 22.

In the present embodiment, the optical axis of the conversion lens 28 extends perpendicularly to both of the first imaginary axis L1 and the second imaginary axis L2.

Figure 16:
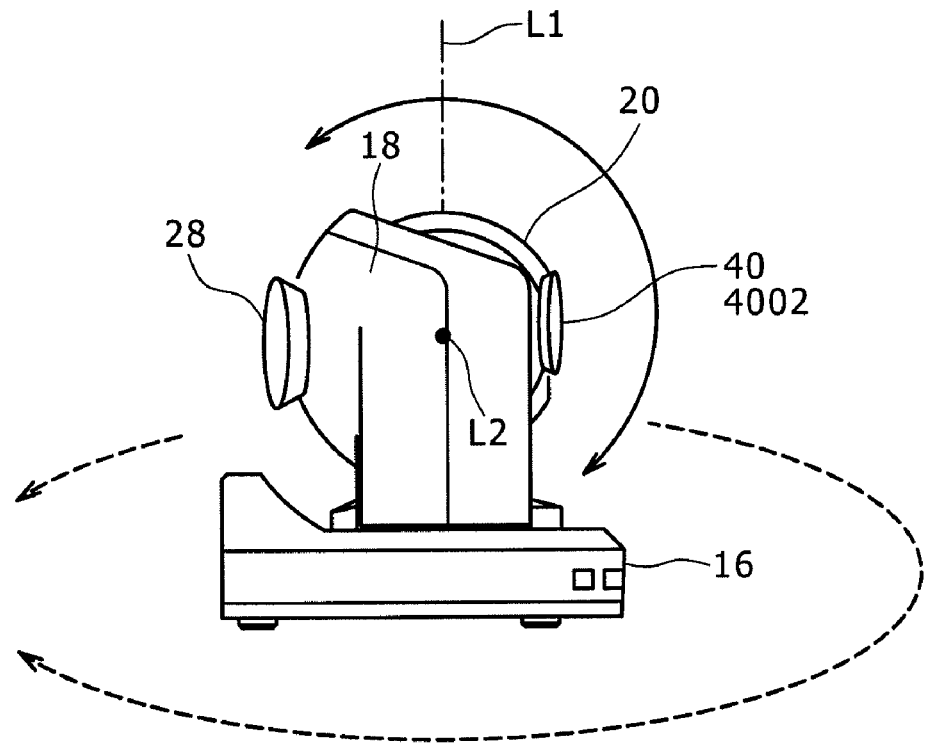
FIG. 16 is a side elevational view of the camera apparatus illustrating a conversion lens non-use range.
Figure 17:
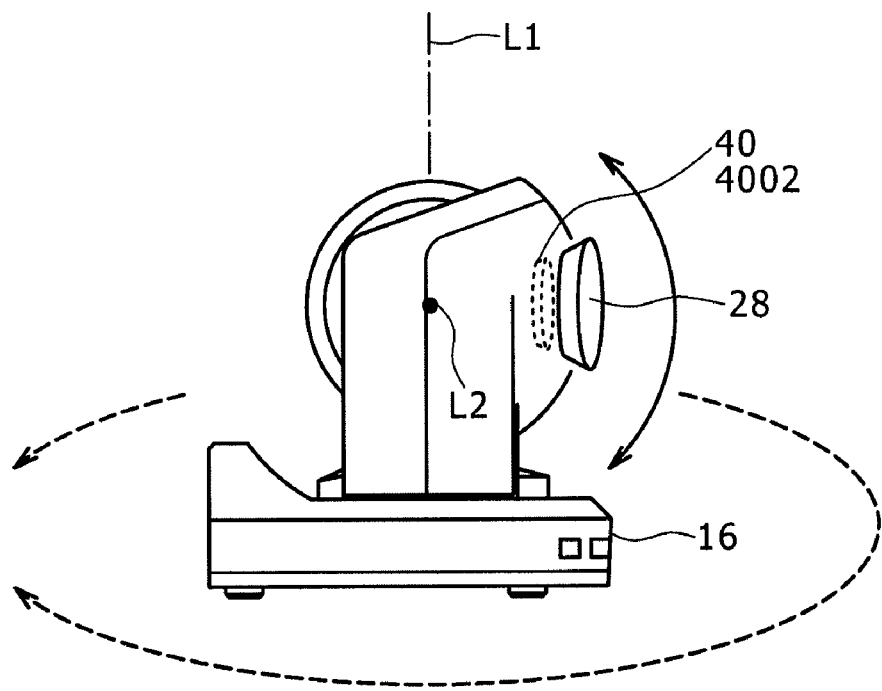
FIG. 17 is a side elevational view of the camera apparatus illustrating a conversion lens use position.

Thus, rotation of the inner case 20 by the second driving section 26 (FIG. 12) is carried out between the conversion lens use position shown in FIG. 17 and a conversion lens non-use range shown in FIG. 16.

(Using Method)

Now, a using method where the remote controller 14 is used to remotely control the camera apparatus 10 is described.

It is to be noted that, in the present embodiment, as seen in FIG. 2, one of the operation switches 1404 of the remote controller 14 is formed as a conversion lens changeover switch 1420 for changing over the conversion lens 28 between a use state and a non-use state.

Accordingly, if the conversion lens changeover switch 1420 is turned on, then the remote controller 14 transmits a control instruction to use the conversion lens to the camera apparatus 10. On the other hand, if the conversion lens changeover switch 1420 is turned off, then the remote controller 14 transmits a control instruction not to use the conversion lens to the camera apparatus 10.

However, if the joystick 1406 is operated to rock in the X direction in FIG. 2, that is, in the leftward or rightward direction, then the remote controller 14 transmits a control instruction to rotate the outer case 18 around the first imaginary axis L1, that is, a panning direction turning instruction, to the camera apparatus 10.

On the other hand, if the joystick 1406 is operated to rock in the Y direction in FIG. 2, that is, in the forward or backward direction, then the remote controller 14 transmits a control instruction to rotate the inner case 20 around the second imaginary axis L2, that is, a tiling direction turning instruction, to the camera apparatus 10.

Further, if the joystick 1406 is operated to rotate in the leftward direction, then the remote controller 14 transmits a control instruction to increase the zoom ratio, that is, to vary the focal distance toward the telephoto end side, that is, a telephoto instruction, to the camera apparatus 10.

However, if the joystick 1406 is operated to rotate in the rightward direction, then the remote controller 14 transmits a control instruction to decrease the zoom ratio, that is, to vary the focal distance toward the wide angle end side, that is, a wide angle instruction, to the camera apparatus 10.

Figure 18:
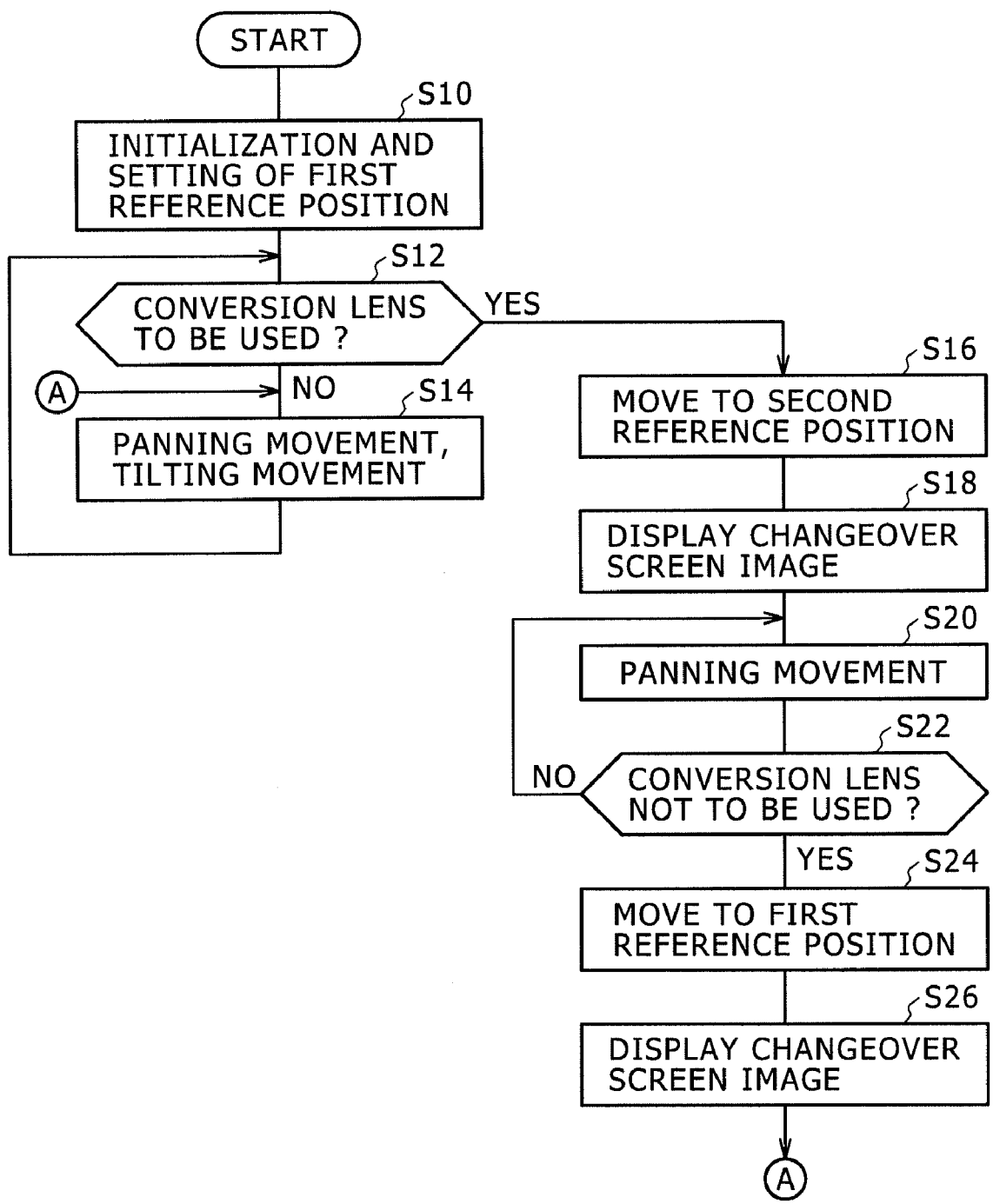
FIG. 18 is a flow chart illustrating operation of the camera apparatus when the remote controller is used to remotely control the camera apparatus.

Referring to FIG. 18, if the power supply to the camera apparatus 10 is made available, then the control section 58 carries out an initialization operation and a reference position setting operation at step S10.

The initialization operation is an operation of initializing the components of the camera apparatus 10 in preparation for starting of operation of the camera apparatus 10. For example, as an initialization operation, the control section 58 controls the focusing mechanism 44 and the zooming mechanism 46 through the driving control section 52 to set the focal position and the zoom ratio of the image pickup optical system 40 to a reference position and a reference zoom ratio determined in advance, respectively.

The first reference position setting operation is an operation of positioning the outer case 18 and the inner case 20 to a first reference position through control of the first driving section 24 and the second driving section 26 by the control section 58.

Figure 8:
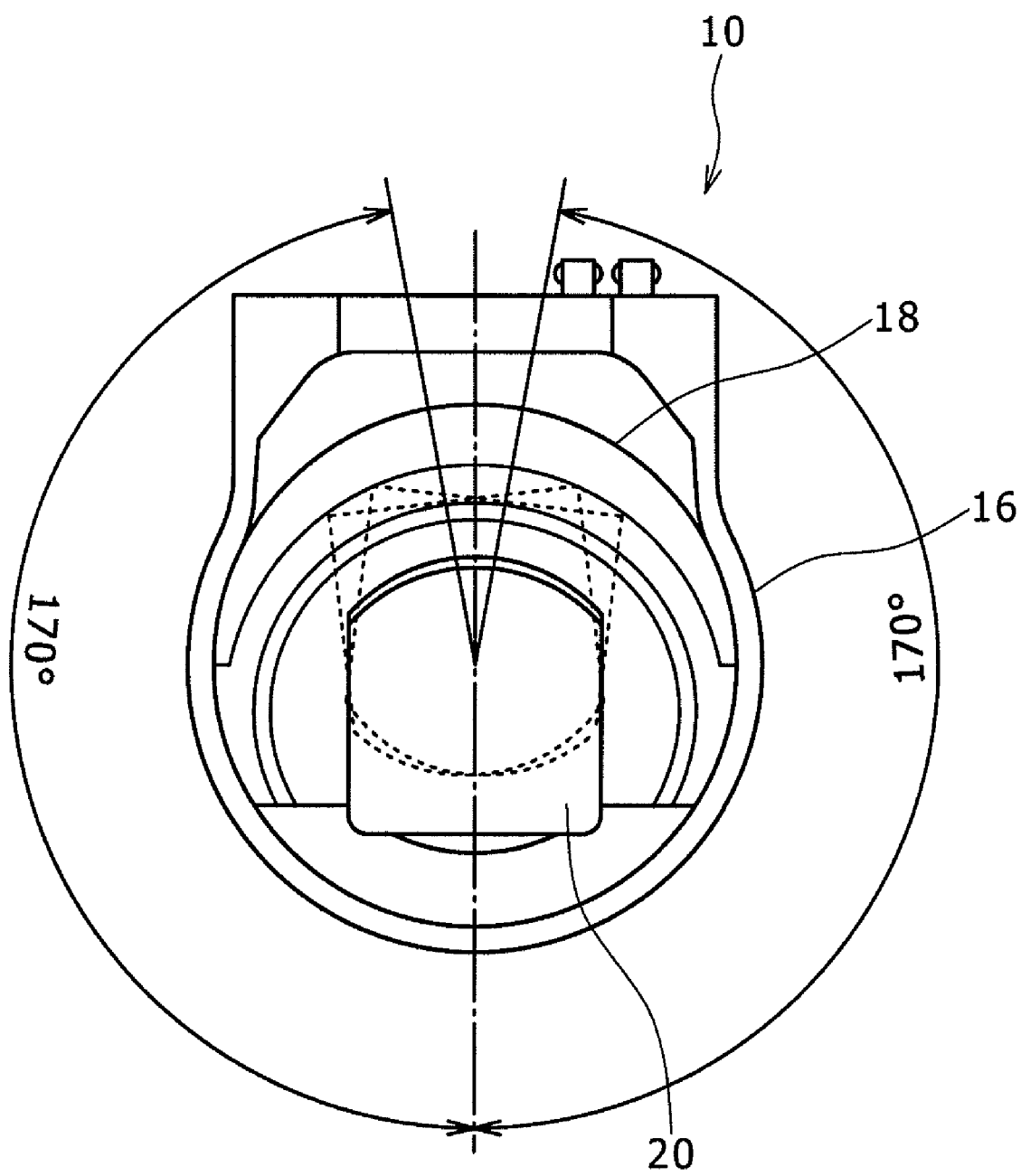

In particular, the first reference position is a position in which the inner case 20 is within the conversion lens non-use range and the optical axis of the image pickup optical system 40 is directed to the front of the base 16 as seen in FIGS. 7 and 8. In the present embodiment, at the first reference position, the optical axis of the image pickup optical system 40 extends on a plane perpendicular to the first imaginary axis L1.

When the inner case 20 is within the conversion lens non-use range, the light path of the image pickup optical system 40 is displaced from the conversion lens 28 and the outer case 18 and the focal distance of the image pickup optical system 40 becomes the focal distance solely of the image pickup optical system 40 except the conversion lens 28. In other words, the zoom ratio and the angle of view of the image pickup optical system 40 are given by the zoom ratio and the angle of view solely of the image pickup optical system 40.

Then, the control section 58 decides whether or not a control instruction to use the conversion lens 28 is received from the remote controller 14 at step S12.

If the result of the decision at step S12 is in the negative "N" (No), then the control section 58 controls the first driving section 24 and the second driving section 26 in accordance with a panning direction turning instruction and a tilting direction turning instruction supplied thereto from the remote controller 14 in response to an operation of the joystick 1406, respectively. Consequently, the outer case 18 and the inner case 20 are rotated around the first and second imaginary axes L1 and L2 to carry out a panning operation and a tiling operation as seen in FIG. 16 at step S14, respectively.

It is to be noted that, in the present embodiment, in a state wherein the inner case 20 is positioned in the conversion lens non-use range, the outer case 18 rotates over a range of 350 degrees around the first imaginary axis L1. More particularly, the outer case 18 rotates over a range of 175 degrees in each of the left and rightward directions from the first reference position.

Further, in the present embodiment, the inner case 20 rotates over a range of 30 degrees downwardly from the first reference position and over a range of 90 degrees upwardly from the first reference position.

It is to be noted that, although the range or rotation of the inner case 20 around the second imaginary axis L2 is not limited particularly, the inner case 20 may be rotated to a position at which the objective lens 4002 of the image pickup optical system 40 is opposed to the base portion 18A of the outer case 18, or in other words, by 90 degrees downwardly from the first position.

By the configuration just described, since the objective lens 4002 is covered with the base portion 18A, the objective lens 4002 can be advantageously protected from dust and so forth.

If the result of the decision at step S12 is in the affirmative "Y" (Yes), then the control section 58 carries out a second reference position setting operation at step S16.

The second reference position setting operation is an operation of positioning the outer case 18 and the inner case 20 at a second reference position through control of the first driving section 24 and the second driving section 26 by the control section 58.

In particular, the second reference position is a position in which the inner case 20 assumes the conversion lens use position and the optical axis of the image pickup optical system 40 is directed to the front of the base 16. In the present embodiment, the optical axis of the image pickup optical system 40 extends on a plane perpendicular to the first imaginary axis L1.

Incidentally, when the inner case 20 rotationally moves from the conversion lens non-use range to the conversion lens use position, also the optical axis of the image pickup optical system 40 rotates around the second imaginary axis L2.

In the procedure, an image of the ceiling or the sky where no image pickup object exists is temporarily picked up, and accordingly, it is a matter of concern to the user that an unnecessary image other than an image of the image pickup object is displayed on the monitor 12.

In order to prevent such a trouble as just described, in the present embodiment, while the inner case 20 rotationally moves from within the conversion lens non-use range to the conversion lens use position, the control section 58 controls the video signal production section 50 to display a changeover screen on the monitor 12 at step S18.

As such a changeover screen as just mentioned, the entire screen of the monitor 12 may display a uniform color such as, for example, blue, white or black.

Also it is a possible idea to store, at a point of time at which the control section 58 accepts a control instruction to use the conversion lens 28 from the remote controller 14, a currently picked up image into a memory and display the image as the changeover screen image on the monitor 12.

By display of such a changeover screen image as described above, the user need not watch such an unnecessary image as described hereinabove, which is advantageous to achieve improvement of the feeling in use.

Then, when the inner case 20 rotationally moves to the conversion lens use position, the optical axis of the image pickup optical system 40 is brought into alignment with the optical axis of the conversion lens 28 and the zoom ratio of the optical system including the conversion lens 28 and the image pickup optical system 40 is displaced to the wide angle end side or the telephoto end side, in the present embodiment, to the wide angle end side.

The control section 58 controls the first driving section 24 in accordance with a panning direction turning instruction supplied thereto from the remote controller 14 in response to an operation of the joystick 1406. Consequently, the outer case 18 is rotated around the first imaginary axis L1 to carry out a panning operation as seen in FIG. 17 at step S20.

It is to be noted that, while, in the present embodiment, the conversion lens 28 cannot move in a direction around the second imaginary axis L2, since the angle of view of the conversion lens 28 is 180 degrees, the camera apparatus 10 can pick up an image over a wide range without any trouble.

Further, in the present embodiment, where the inner case 20 is positioned at the conversion lens use position, the outer case 18 rotates over a range of 350 degrees around the first imaginary axis L1. More particularly, the outer case 18 rotates over a range of 175 degrees in each of the leftward and rightward directions from the second reference position.

Then, the control section 58 decides whether or not a control instruction not to use the conversion lens 28 is accepted from the remote controller 14 at step S22.

If the result of the decision at step S22 is in the negative "N," then the processing returns to step S20.

However, if the result of the decision at step S22 is in the affirmative "Y," then the control section 58 controls the first driving section 24 and the second driving section 26 to assume the first reference position at which the inner case 20 is positioned in the conversion lens non-use range and the optical axis of the image pickup optical system 40 is directed forwardly of the base 16 at step S24 as similarly as at step S10.

Thereupon, when the inner case 20 rotationally moves from the conversion lens use position into the conversion lens non-use range, also the optical axis of the image pickup optical system 40 rotates around the second imaginary axis L2.

In the procedure, an image of the ceiling or the sky where no image pickup object exists is temporarily picked up, and accordingly, it is a matter of concern to the user that an unnecessary image other than an image of the image pickup object is displayed on the monitor 12.

Accordingly, similarly as at step S18, while the inner case 20 rotationally moves from the conversion lens use position into the conversion lens non-use range, the control section 58 controls the video signal production section 50 to display a changeover screen on the monitor 12 at step S26.

By display of such a changeover screen image as described above, the user need not watch such an unnecessary image as described hereinabove, which is advantageous to achieve improvement of the feeling in use.

Then, the processing returns to step S14 to execute similar operation.

It is to be noted that, in the present embodiment, the video signal production section 50 and the control section 58 construct changeover image signal production means for producing a video signal for causing a changeover screen image to be displayed on the monitor 12 while the inner case 20 rotationally moves between the conversion lens use position and the conversion lens non-use range.

The configuration as described above, by rotating the inner case 20 to the conversion lens use position at which the optical axis of the image pickup optical system 40 is aligned with the optical axis of the conversion lens 28, image pickup using the conversion lens 28 can be carried out.

Further, by rotating the inner case 20 into the conversion lens non-use range wherein the optical path of the image pickup optical system 40 is displaced from the conversion lens 28, image pickup only using the image pickup optical system 40 can be carried out.

Now, an overview of the present invention is described with reference to FIGS. 19 to 23D.

Figure 19:
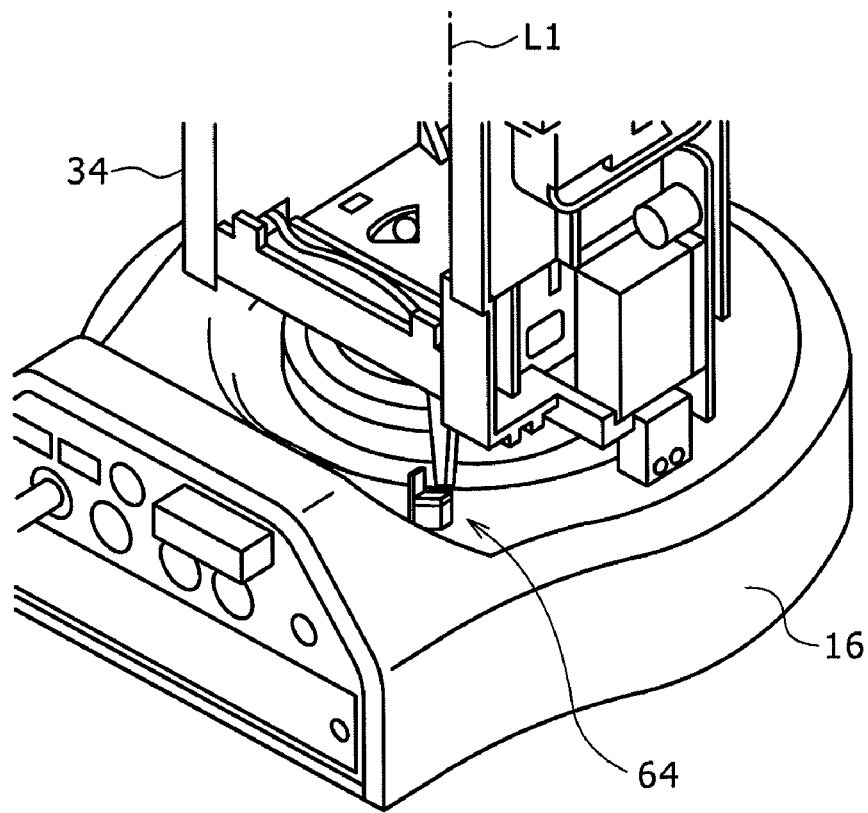
FIG. 19 is a perspective view showing the base, a frame, and a stopper mechanism of the camera apparatus.

Referring first to FIG. 19, a stopper mechanism 64 restricts or defines the range of rotation of the frame 34 on which the camera section 22 (FIG. 12) is supported to a range of 720 degrees on the base 16.

Accordingly, in the present embodiment, the first member is the base 16 and the second member is the frame 34, and the frame 34 rotates around the first imaginary axis L1 on the base 16.

Figure 20:
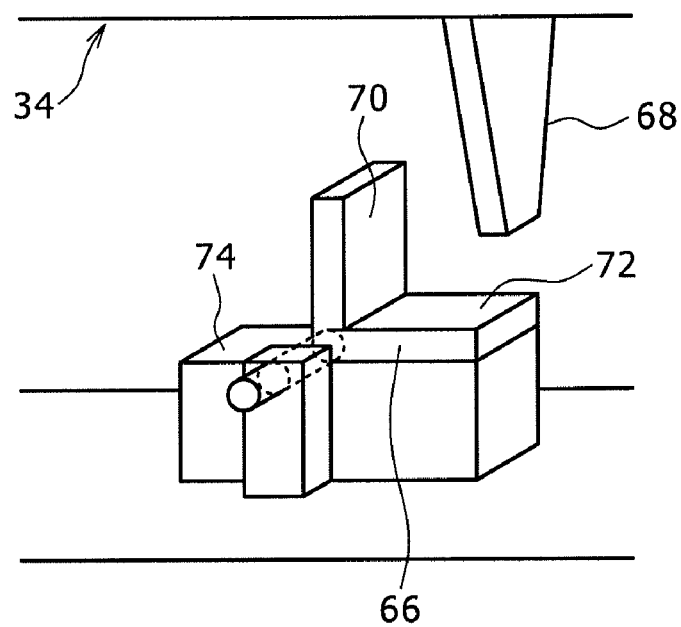
FIGS. 20 and 21 are operational perspective views of the stopper mechanism.
Figure 21:
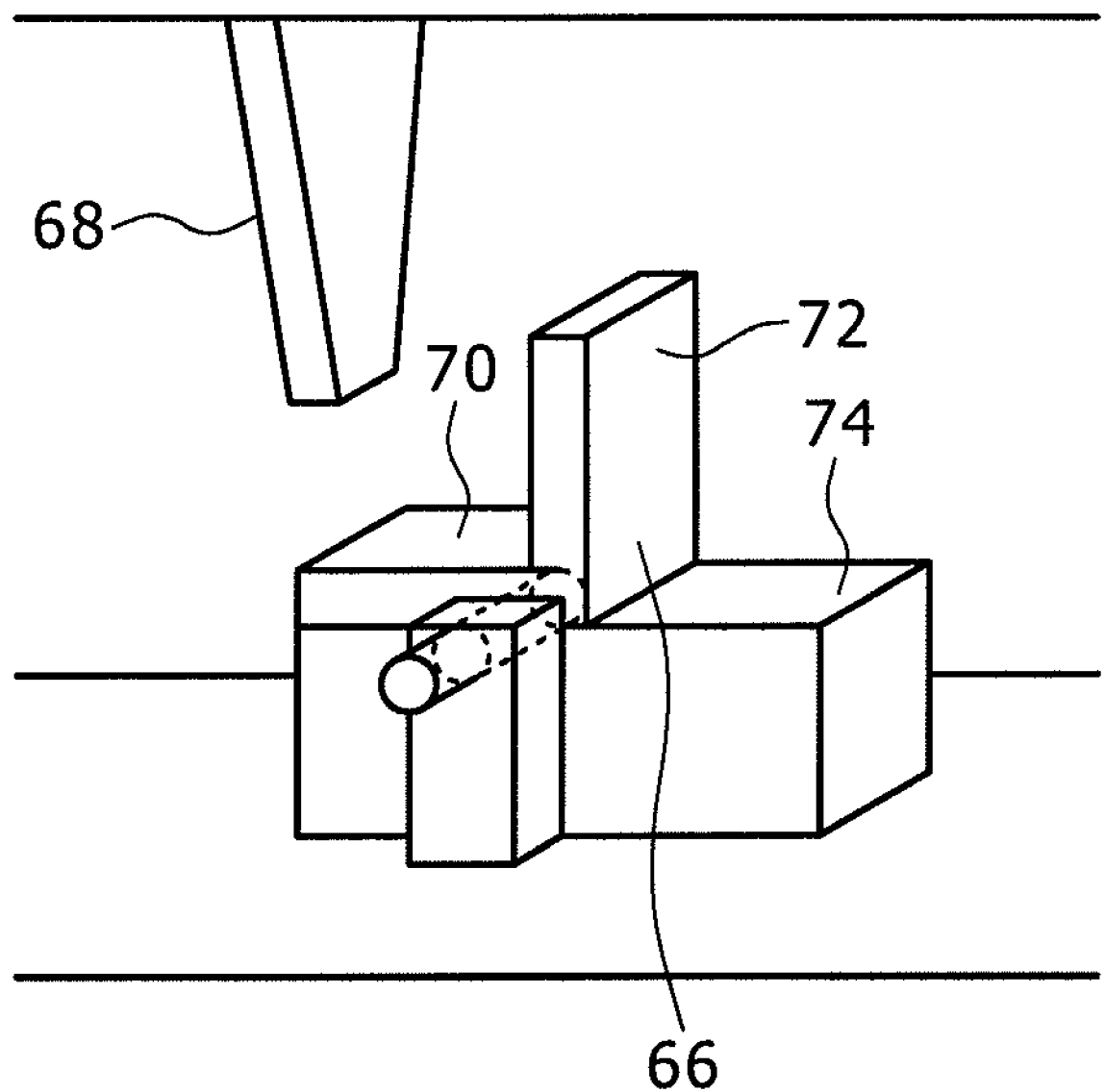

Referring to FIGS. 20 and 21, the stopper mechanism 64 includes a first stopper 66 provided on the base 16 and a second stopper 68 provide on the frame 34 for integral rotation with the frame 34.

The second stopper 68 is provided in a projecting manner from a lower face of the frame 34 and rotates integrally with the frame 34.

One of the opposite directions of rotation of the frame 34 around the first imaginary axis L1 is hereinafter referred to as first direction, and the reverse direction is hereinafter referred to as second direction.

As seen in FIGS. 20 and 21, the first stopper 66 has a first stopping portion 70 and a second stopping portion 72 which individually move between a retracted position and an abutting position and is formed from a single member.

The retracted position is a position at which the first stopper 66 does not abut with the second stopper 68 upon rotation of the frame 34, and the abutting position is a position at which the first stopper 66 is abutted by the second stopper 68 upon rotation of the frame 34.

Both of the first stopping portion 70 and the second stopping portion 72 have a form of a plate and are provided such that the plates extend perpendicularly to each other.

The first stopper 66 is disposed on an abutting face 74 for rocking motion around a fulcrum provided by an intersecting portion of the first stopping portion 70 and the second stopping portion 72.

The first and second stopping portions 70 and 72 are laid on the abutting face 74 at the retracted position thereof and are erected uprightly from the abutting face 74 at the abutting position thereof.

Figure 22A:
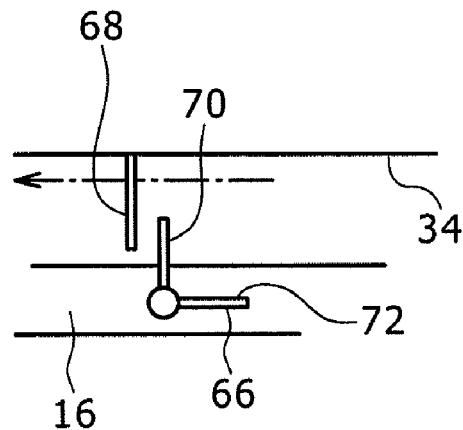
FIGS. 22A to 22D are views such that a first stopper moves to a retracted position from an abutting position and a second stopper moves to the abutting position from the retracted position.
Figure 22B:
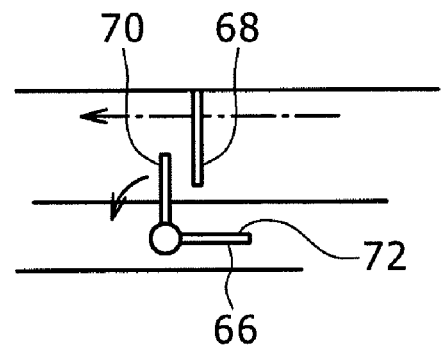
Figure 22C:
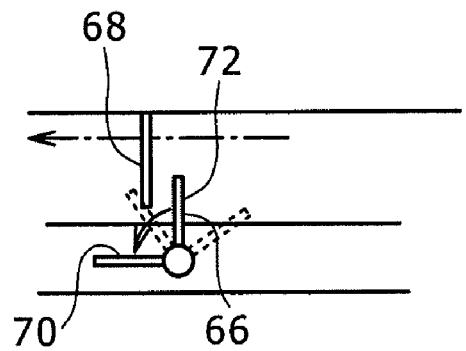
Figure 22D:
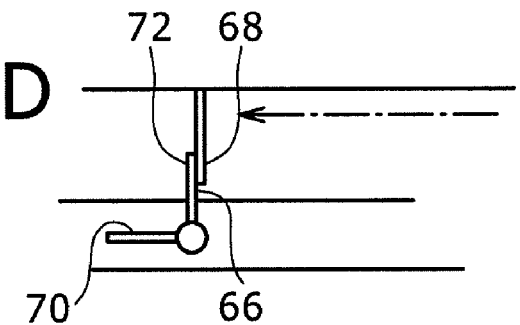

In a first state wherein the first stopping portion 70 is positioned at the abutting position and the second stopping portion 72 is positioned at the retracted position as seen in FIG. 22A, the first stopping portion 70 is abutted by the second stopper 68 of the frame 34 when it rotates in the first direction as seen in FIGS. 22B and 22C so that the first stopper 66 is moved to establish a second state wherein the first stopping portion 70 is positioned at the retracted position and the second stopping portion 72 is positioned at the abutting position as seen in FIG. 22D.

When the second stopping portion 72 is abutted by the second stopper 68 of the frame 34 which rotates in the first direction in the second state, the first stopper 66 is blocked against movement thereby to stop further rotation of the frame 34 as seen in FIG. 22D.

Figure 23A:
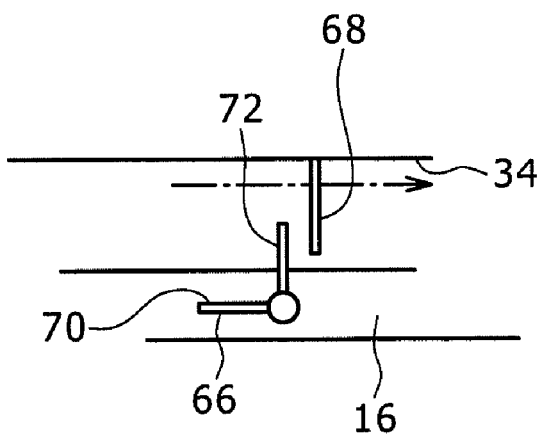
FIGS. 23A to 23D are views such that the second stopper moves to the retracted position from the abutting position and the first stopper moves to the abutting position from the retracted position.
Figure 23B:
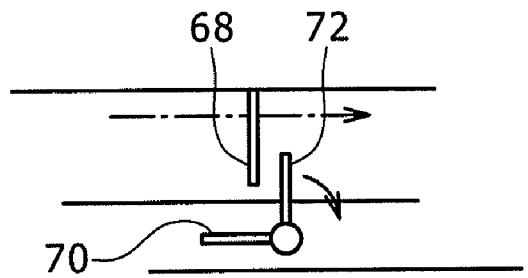
Figure 23C:
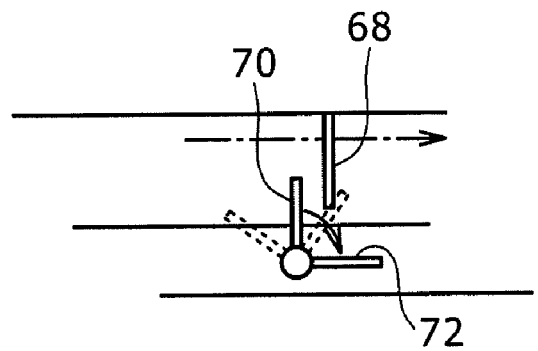
Figure 23D:
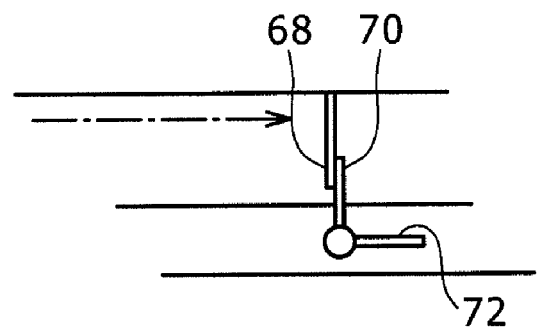

When the second stopping portion 72 is abutted by the second stopper 68 of the frame 34 rotating in the second rotation in the second state as seen in FIGS. 23A and 23B, the first stopper 66 is moved to establish the first state as seen in FIGS. 23C and 23D.

When the first stopping portion 70 is abutted by the second stopper 68 of the frame 34 rotating in the second direction in the first state, the first stopper 66 is blocked against movement thereby to stop further rotation of the frame 34 as seen in FIG. 23D.

Figure 24:
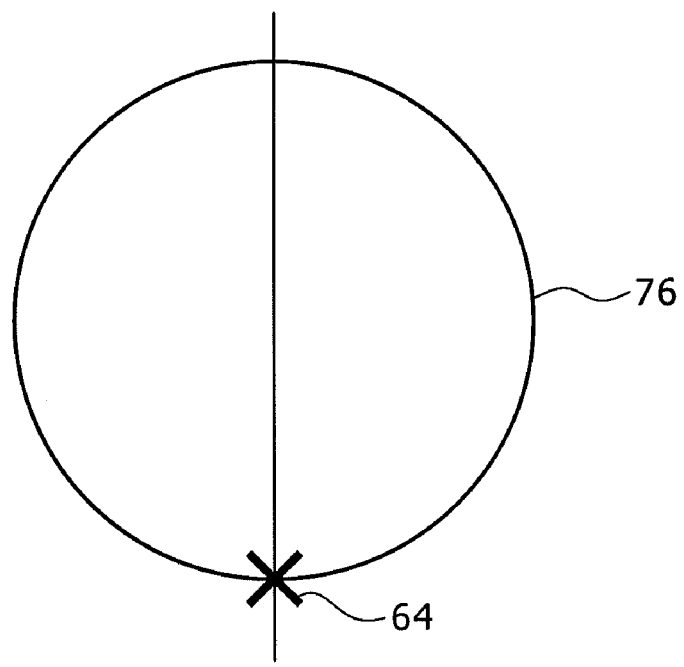
FIG. 24 is a schematic view showing a range of rotation of the frame.

Referring to FIG. 24, upon rotation of the frame 34, the second stopper 68 exhibits such a locus of movement as indicated by a circle 76.

In the present embodiment, when the frame 34 (second stopper 68) rotates in the first direction, it rotates from a rotational position shown in FIG. 22A to another rotational position shown in FIGS. 22B and 22C thereby to rotate over 360 degrees. As the frame 34 (second stopper 68) further rotates in the first direction, it rotates from the rotational position shown in FIGS. 22B and 22C to a further rotational position shown in FIG. 22D thereby to rotate over further 360 degrees.

On the other hand, when the frame 34 (second stopper 68) rotates in the second direction, it rotates from a rotational position shown in FIG. 23A to another rotational position shown in FIGS. 23B and 23C thereby to rotate over 360 degrees. As the frame 34 (second stopper 68) further rotates in the second direction, it rotates from the rotational position shown in FIGS. 23B and 23C to a further rotational position shown in FIG. 23D thereby to rotate over further 360 degrees.

Accordingly, the range of rotation of the frame 34, that is, the range of revolution of the second stopper 68, is restricted to a range of 720 degrees by the stopper mechanism 64.

According to the present embodiment, the first stopper 66 provided on the base 16 and the second stopper 68 provided on the frame 34 form the stopper mechanism 64, and the first stopper 66 is formed from the first stopping portion 70 and the second stopping portion 72.

Thus, the second stopping portion 72 is abutted by the second stopper 68 which revolves in the first direction to stop the rotation of the frame 34 in the first direction. Further, the first stopping portion 70 is abutted by the second stopper 68 which revolves in the second direction to stop the rotation of the frame 34 in the second direction.

Accordingly, the range of rotation of the frame 34 with respect to the base 16 can be restricted to a range greater than 360 degrees with a simple and compact configuration without using a slip ring. This is advantageous to achieve enhancement of the durability and reduction of the cost of the camera apparatus 10.

Figure 25:
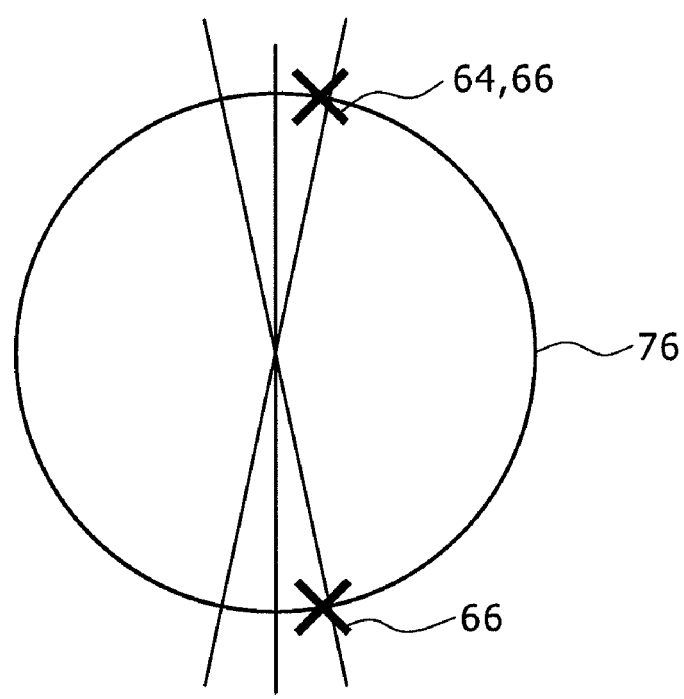
FIG. 25 is a schematic view showing a range of rotation of the frame in a modified form.

It is to be noted that, where the first stopper 66 is disposed at two positions displaced from each other in a circumferential direction of the base 16 as seen in FIG. 25, if the positions are displaced, for example, by a desired angle in the opposite circumferential directions with reference to positions spaced by 180 degrees from each other, then it is possible to adjust increase or decrease of the range of rotation of the frame 34.

More particularly, increase or decrease of the range of rotation of the frame 34 can be adjusted within a range which is greater than 360 degrees but smaller than 720 degrees.

If the first stopping portion 70 and the second stopping portion 72 are formed from a magnetic material and the abutting face 74 is formed as a face of a permanent magnet, then the first stopping portion 70 or the second stopping portion 72 at the retracted position is attracted by the magnetic force of the abutting face 74.

Accordingly, in what posture the camera apparatus 10 is installed, that is, even if the camera apparatus 10 is directed downwardly or horizontally, stabilization of the posture of the first stopper 66 can be anticipated. This is advantageous to achieve stabilization of operation of the stopper mechanism 64.

(Second Embodiment)

Now, a second embodiment of the present invention is described.

Figure 26:
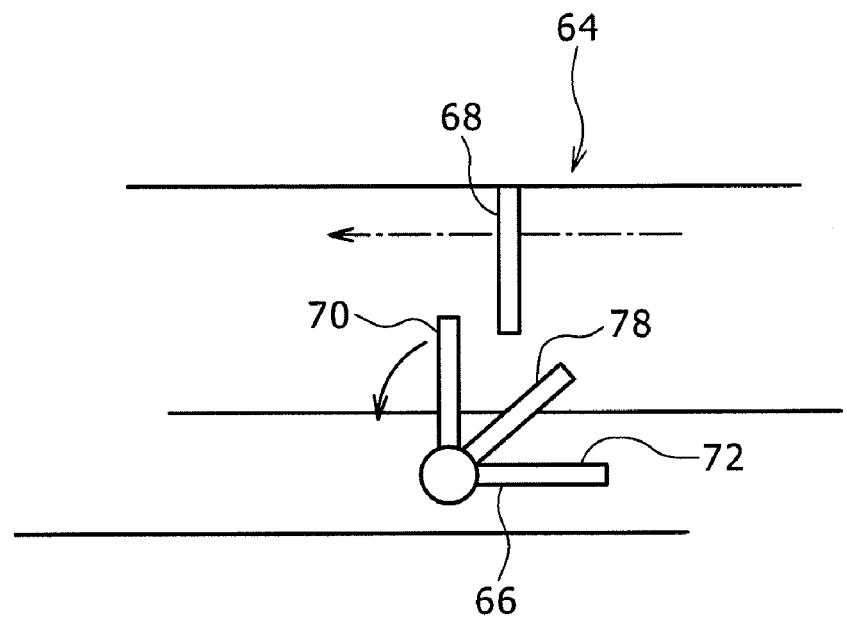
FIG. 26 is a view showing the stopper mechanism in a second embodiment.
Figure 27:
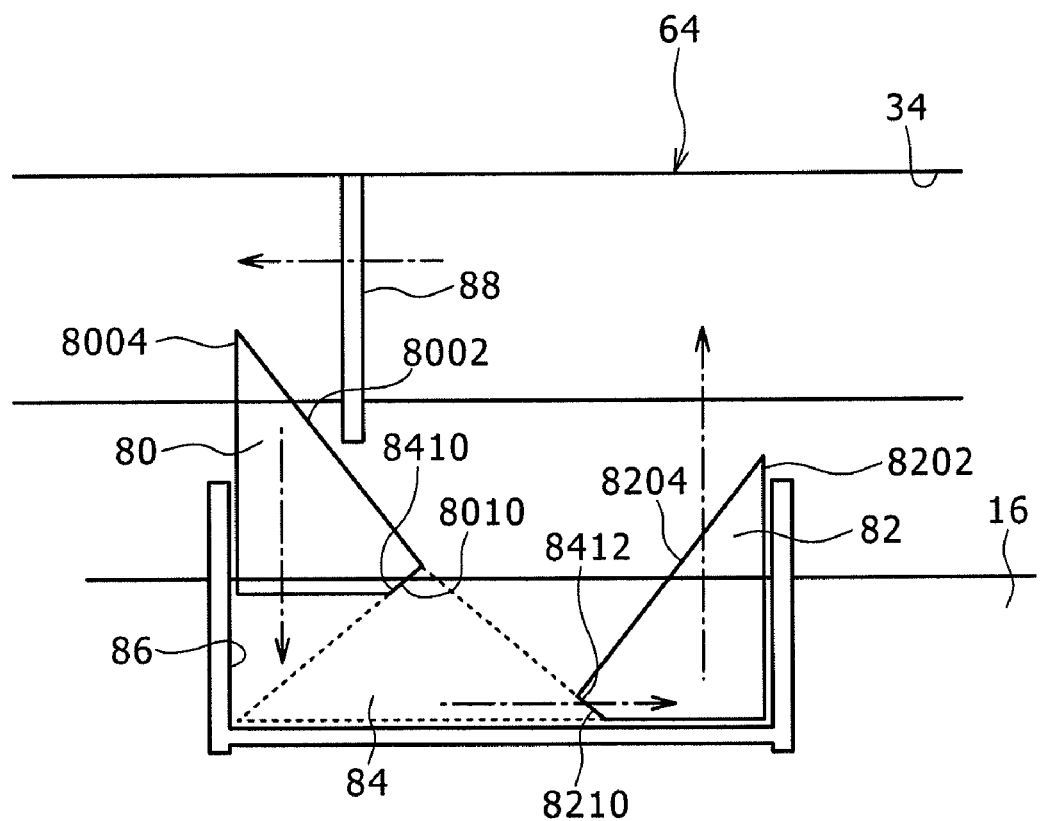
FIGS. 27 and 28 are views showing the stopper mechanism in a third embodiment.
Figure 28:
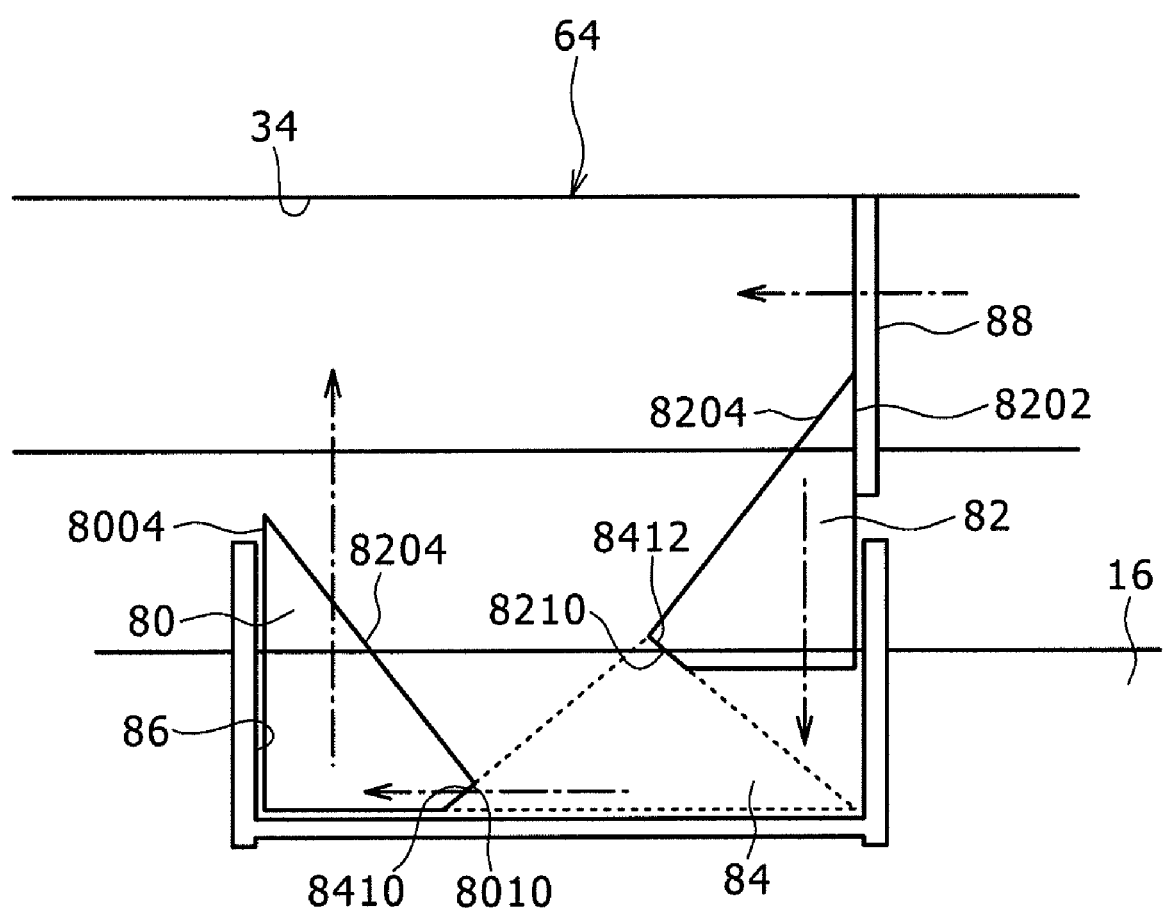

FIG. 26 shows the stopper mechanism 64 in the second embodiment.

Referring to FIG. 26, in the second embodiment, the first stopper 66 additionally includes a third stopping portion 78.

Also in the present embodiment, at the abutting position of the first and second stopping portions 70 and 72, the first and second stopping portions 70 and 72 are erected uprightly from the abutting face 74, but at the retracted position of the first and second stopping portions 70 and 72, the first and second stopping portions 70 and 72 are retracted to and laid on the abutting face 74 (FIGS. 20 and 21) similarly as in the first embodiment.

The third stopping portion 78 is provided between the first stopping portion 70 and the second stopping portion 72 such that it is rocked integrally with the first stopping portion 70 and the second stopping portion 72 around a fulcrum.

In the second embodiment, when the first stopping portion 70 is abutted by the second stopper 68 which revolves in the first direction in the first state, the first stopper 66 is moved to establish a third state wherein the first and second stopping portions 70 and 72 are positioned at the retracted position and the third stopping portion 78 is positioned at the abutting position.

If the third stopping portion 78 is abutted by the second stopper 68 revolving in the first direction in the third state, the first stopper 66 is moved to establish the second state.

If the second stopping portion 72 is abutted by the second stopper 68 revolving in the second direction in the second state, then the first stopper 66 is moved to establish the third state wherein the first and second stopping portions 70 and 72 are positioned at the retracted position and the third stopping portion 78 is positioned at the abutting position.

If the third stopping portion 78 is abutted by the second stopper 68 revolving in the second direction in the third state, the first stopper 66 is moved to establish the first state.

In this instance, preferably the first stopper 66 is supported for rocking motion with frictional force such that it is rocked only when the force acting upon the first, second or third stopping portion 70, 72 or 78 is higher than a predetermined level.

In the second embodiment, since the third stopping portion 78 is provided additionally, the range of rotation of the frame 34 can be set within a range which is greater than 720 degrees but is smaller than 1,080 degrees.

(Third Embodiment)

Now, a third embodiment of the present invention is described.

In the third embodiment, the stopper mechanism 64 includes first, second and third slide members 80, 82 and 84, an accommodation box 86, a stopper 88 and so forth.

The stopper 88 is provided on the frame 34 similarly as in the first and second embodiments.

The first, second and third slide members 80, 82 and 84 and the accommodation box 86 are provided on the base 16.

The first, second and third slide members 80, 82 and 84 are accommodated in the accommodation box 86 such that the third slide member 84 is interposed between the first slide member 80 and the second slide member 82.

The accommodation box 86 is disposed on and attached to the base 16, and the first slide member 80 and the second slide member 82 selectively project from an opening of the accommodation box 86.

More particularly, when the first slide member 80 moves to the projecting position, the second slide member 82 is positioned at a retracted position at which it is entirely accommodated in the accommodation box 86. On the other hand, when the second slide member 82 moves to the projecting position, the first slide member 80 is positioned at a retracted position at which it is entirely accommodated in the accommodation box 86.

In a first state wherein the first slide member 80 is positioned at the abutting position and the second slide member 82 is positioned at the retracted position, if a first engaging face 8002 of the first slide member 80 is abutted by the stopper 88 which revolves in the first direction, then a second state is established. In particular, from the first state, the first, second and third slide members 80, 82 and 84 move until the first slide member 80 is positioned at the retracted position and the second slide member 82 is positioned at the abutting position thereby to establish the second state.

It is to be noted that the movement described above of the first, second and third slide members 80, 82 and 84 is carried out through engagement of a first slide face 8010 of the first slide member 80 and a second slide face 8410 of the third slide member 84 and engagement between a second slide face 8412 of the third slide member 84 and a first slide face 8210 of the second slide member 82.

Further, when a first engaging face 8202 of the second slide member 82 is abutted by the stopper 88 revolving in the first direction in the second state, the first, second and third slide members 80, 82 and 84 are blocked from movement thereby to stop the rotation of the frame 34.

Further, when a second engaging face 8204 of the second slide member 82 is abutted by the stopper 88 revolving in the second direction in the second state, the first, second and third slide members 80, 82 and 84 are moved to establish the first state.

On the other hand, when a second engaging face 8004 of the first slide member 80 is abutted by the stopper 88 revolving in the second direction in the first state, the first, second and third slide members 80, 82 and 84 are blocked from further movement thereby to stop the rotation of the frame 34.

With the third embodiment having such a configuration as described above, similar effects to those which are achieved by the first embodiment are achieved.

It is to be noted that, in the embodiments described above, the electronic apparatus is a camera apparatus.

However, the present invention can be applied widely to any electronic apparatus which includes a first member and a second member provided on the first member for rotation in both of a first direction which is a circumferential direction centered at a first imaginary axis which passes the first member and a second direction reverse to the first direction.

The present application contains subject matter related to that disclosed in Japanese Priority Patent Application JP 2008-238997 filed with the Japan Patent Office on Sep. 18, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
   a first member;
   a second member provided on said first member for rotation in a first direction which is a circumferential direction around a first imaginary axis which passes said first member and a second direction reverse to the first direction; and
   a stopper mechanism for defining a range of rotation of said second member around the first imaginary axis;
   said stopper mechanism including
      first and second slide members provided on said first member, and
      a stopper provided on said second member for integral rotation with said second member,
   said first and second slide members selectively moving between a retracted position and an abutting position;
   said first and second slid members being moved, when said fist slide member is abutted by said stopper which rotates in the first direction in a first state wherein said first slide member is positioned at the abutting position and said second slid member is positioned at the retracted position, to establish a second state wherein said first slid member is positioned at the retracted position and said second slid member is positioned at the abutting position;
   said first and second slide members being blocked from movement, when said second slide member is abutted by said stopper which rotates in the first direction in the second state, to stop the rotation of said second member;
   said second slide member being moved, when said second slide member is abutted by said stopper which rotates in the second direction in the second state, to establish the first state;
   said first and second slide members being blocked from movement, when said first slide movement is abutted by said stopper which rotates in the second direction in the first state, to stop the rotation of said second members; and
   an accommodation box in which said first and second slide members are accommodated such that, at the abutting position, said first and second slide members project from said accommodation box, but at the retracted position, said first and second slide members are accommodated in the accommodation box,
   said stopper mechanism further including a third slide member interposed between said first and second slide members and accommodated in said accommodation box.

2. The electronic apparatus according to claim 1, further comprising:
   a first electric equipment section provided on said first member;
   a second electric equipment section provided on said second member; and
   a wiring line member provided between said first and second members for transferring a signal or a signal and power supply between said first and second electric equipment sections.

3. The electronic apparatus according to claim 1, wherein the electronic apparatus is a camera apparatus.

* * * * *